United States Patent [19]
Yamada et al.

[11] Patent Number: 5,582,763
[45] Date of Patent: Dec. 10, 1996

[54] LIQUID CRYSTAL COMPOSITION, LIQUID CRYSTAL DEVICE AND LIQUID CRYSTAL APPARATUS USING SAME

[75] Inventors: Syuji Yamada; Masahiro Terada, both of Atsugi; Hiroshi Mizuno, Zama, all of Japan

[73] Assignee: Canon Kabushiki Kaisha, Tokyo, Japan

[21] Appl. No.: 314,422

[22] Filed: Sep. 28, 1994

[30] Foreign Application Priority Data

| Sep. 29, 1993 | [JP] | Japan | 5-026521 |
| Sep. 29, 1993 | [JP] | Japan | 5-026522 |
| Feb. 28, 1994 | [JP] | Japan | 6-054526 |
| Feb. 28, 1994 | [JP] | Japan | 6-054527 |

[51] Int. Cl.$^6$ ............ C09K 19/52; C09K 19/32; C09K 19/30; G02F 1/13
[52] U.S. Cl. .............. 252/299.01; 252/299.62; 252/299.61; 252/299.63; 349/184
[58] Field of Search .......... 252/299.01, 299.62, 252/299.61, 299.63; 359/104

[56] References Cited

U.S. PATENT DOCUMENTS

| 4,367,924 | 1/1983 | Clark et al. | 359/56 X |
| 5,268,123 | 12/1993 | Mori et al. | 252/299.61 |
| 5,305,131 | 4/1994 | Terada et al. | 359/104 |
| 5,354,501 | 10/1994 | Nakamura et al. | 252/299.62 |
| 5,385,692 | 1/1995 | Iwaki et al. | 252/299.62 |

FOREIGN PATENT DOCUMENTS

| 0546338 | 6/1993 | European Pat. Off. |
| 0548548 | 6/1993 | European Pat. Off. |
| 0571955 | 12/1993 | European Pat. Off. |
| 56-107216 | 8/1981 | Japan |
| 60-031120 | 2/1985 | Japan |
| 01140198 | 6/1989 | Japan |
| 03252624 | 11/1991 | Japan |

OTHER PUBLICATIONS

Japanese Journal of Appl. Phys., vol. 29(2), No. 6 (Jun., 1990) L984–86.
Japanese Journal of Appl. Phys., vol. 29(1), No. 9 (Sep., 1990) 1757–64.
Research Disclosure, vol. 345 (Jan. 1993) p. 49.
F. Nakano et al., Japanese Journal of Applied Physics, V. 19 No. 10 (1980), pp. 2013–2014.
Y. Ouchi et al., Japanese Journal of Applied Physics, V. 27 No. 5 (1988), pp. L725–L728.
N. A. Clark and S. T. Lagerwall, Structures and Applications of SSFLC Devices, Sep. 30–Oct. 2, 1986, pp. 456–458, Proceedings of the 6th International Display Research Conference.

*Primary Examiner*—Cynthia Harris Kelly
*Attorney, Agent, or Firm*—Fitzpatrick, Cella, Harper & Scinto

[57] ABSTRACT

A liquid crystal device with little temperature-dependence of drive characteristics, such as response speed, and with good storage stability, can be produced by using a liquid crystal composition, successively assuming SmA (smectic A) phase and SmC* (chiral smectic) phase on temperature decrease. The layer spacing composition has a temperature-dependence of layer spacing d in smectic phase such that the layer spacing d increases, is constant or decreases on temperature decrease in SmA phase temperature range, assumes a first transition point where the layer spacing d abruptly decreases on temperature decrease in vicinity of transition temperature from SmA phase to SmC* phase, and assumes a second transition point where the layer spacing d commences to increase on further temperature decrease below the first transition point in SmC* temperature range.

29 Claims, 14 Drawing Sheets

C1 ALIGNMENT   Ⓗ + δ > α

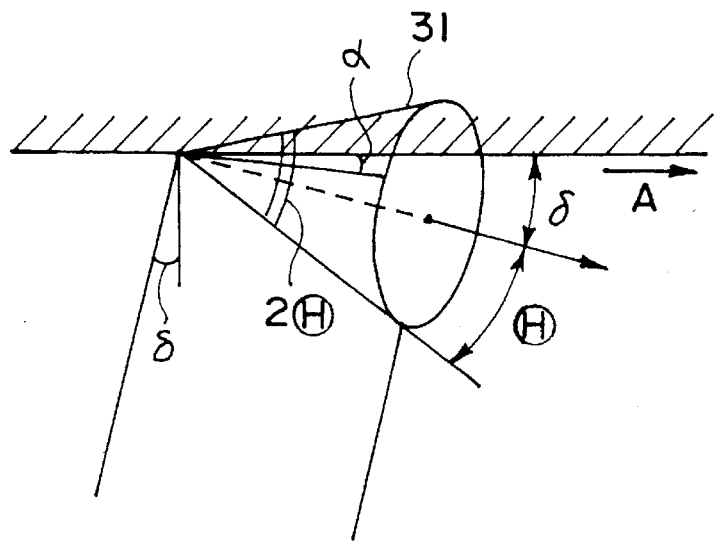
C1 ALIGNMENT  $H + \delta > \alpha$
F I G. 1A
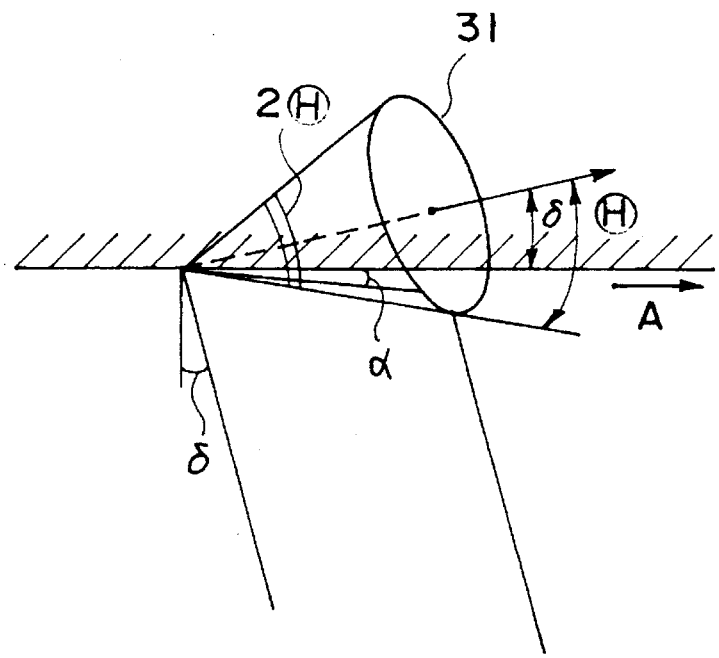
C2 ALIGNMENT  $H - \delta > \alpha$
F I G. 1B

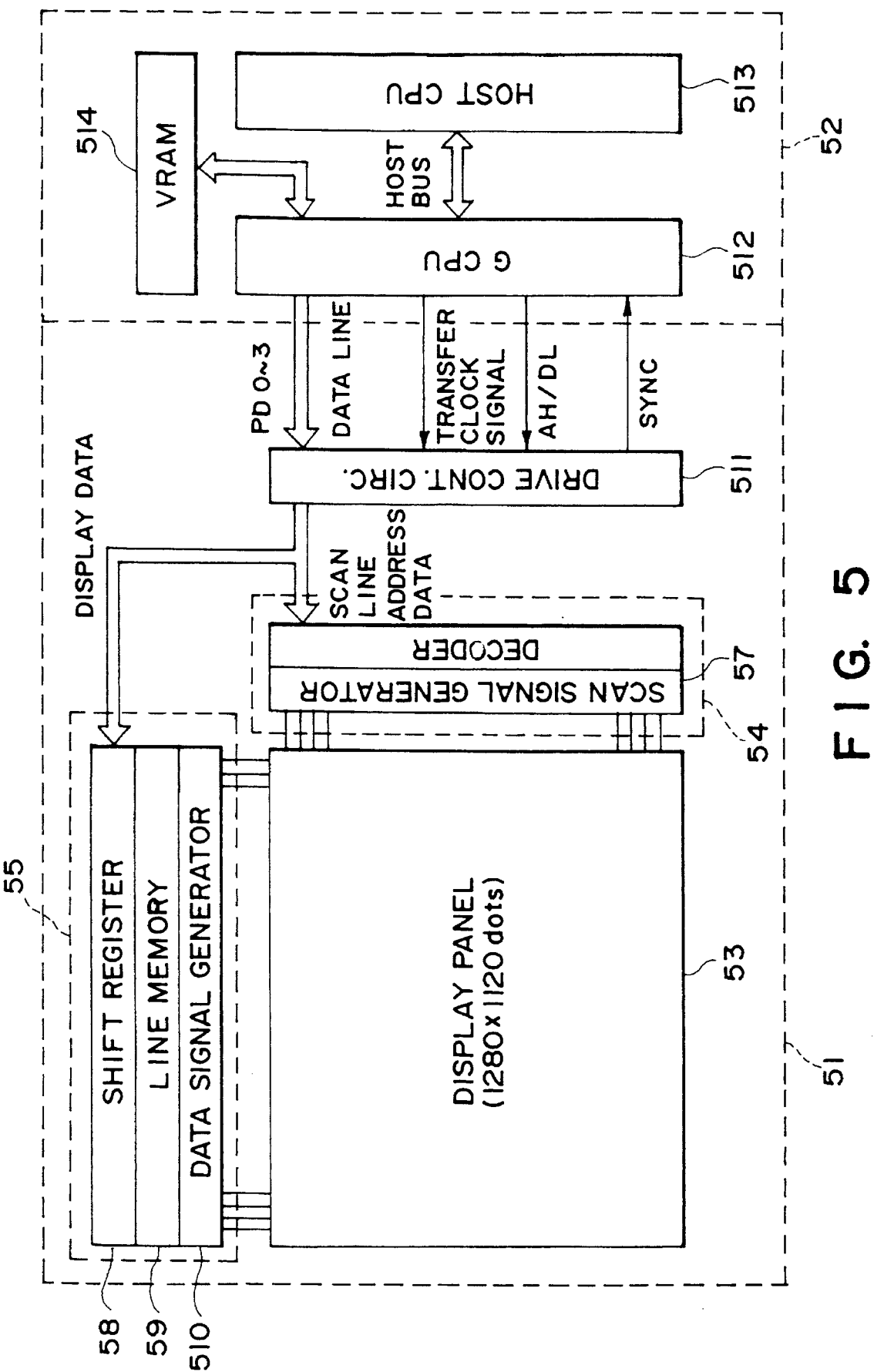
F I G. 5

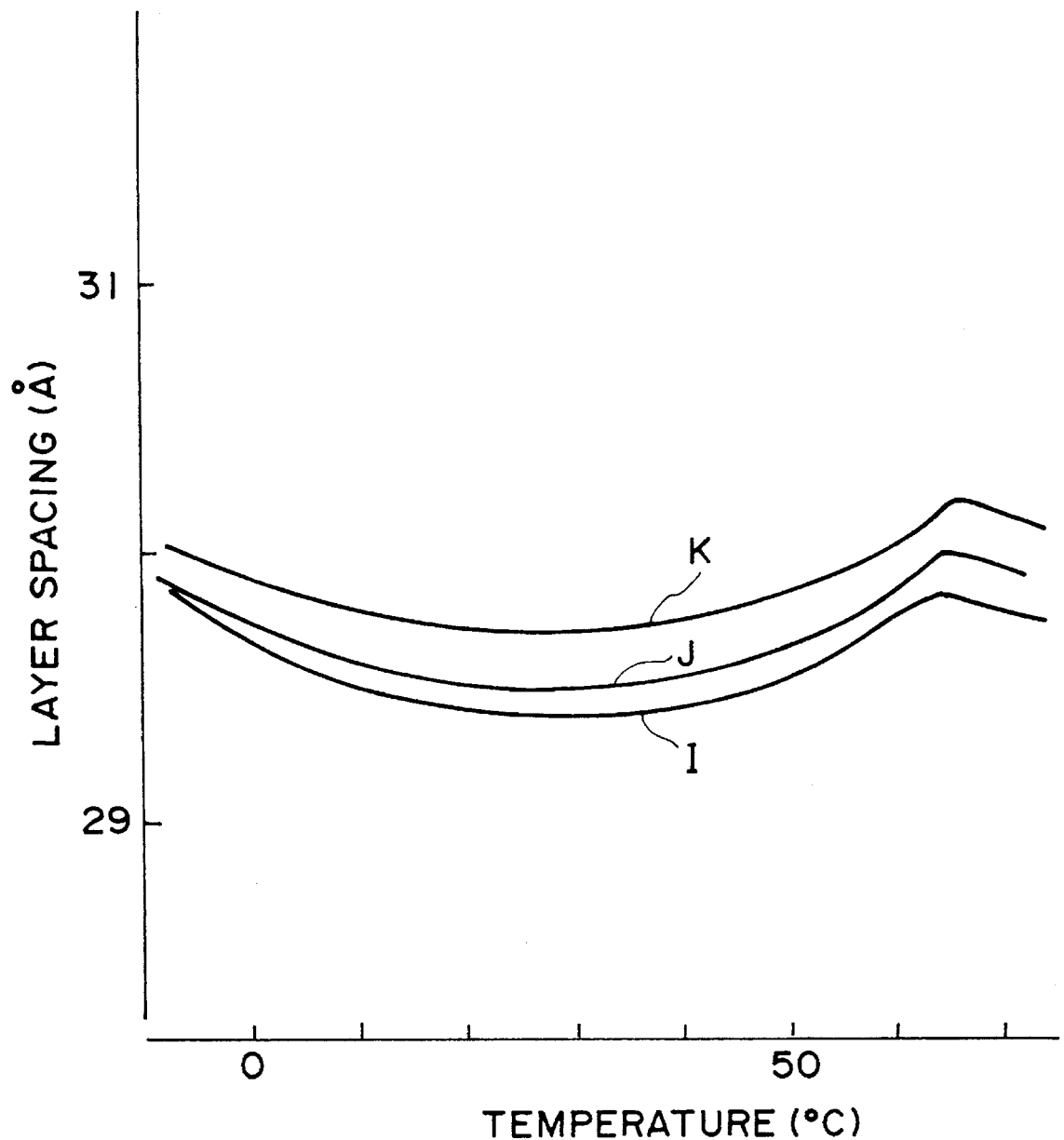
F I G. 12

LIQUID CRYSTAL COMPOSITION, LIQUID CRYSTAL DEVICE AND LIQUID CRYSTAL APPARATUS USING SAME

FIELD OF THE INVENTION AND RELATED ART

The present invention relates to a liquid crystal composition, and a liquid crystal device and a liquid crystal apparatus using the composition. More particularly, the present invention relates to a liquid crystal composition having improved temperature-dependence of response speed and improved drive characteristics, a liquid crystal device using the composition and utilized for liquid crystal display device, liquid crystal-optical shutter, etc., and a liquid crystal apparatus including the liquid crystal device.

Hitherto, a type of liquid crystal device, particularly a ferroelectric liquid crystal device, having bistability has been proposed by Clark and Lagerwall (U.S. Pat. No. 4,367,924, Japanese Laid-Open Patent Application (JP-A) 56-107216, etc.).

A ferroelectric liquid crystal generally has chiral smectic C phase (SmC*) or H phase (SmH*) in a specific temperature range and, in the SmC* or SmH* phase of a non-helical structure, shows a property of assuming either one of a first optically stable state and a second optically stable state responding to an electric field applied thereto and maintaining such a state in the absence of an electric field, namely bistability.

In addition to the bistability, the ferroelectric liquid crystal has an excellent characteristic of a high-speed responsiveness. This is because a switching between alignment states is induced by a direct interaction between a spontaneous polarization inherently owned by the ferroelectric liquid crystal and an applied electric field. The response speed is faster by 3–4 digits than that of a TN-liquid crystal of which the switching between alignment states is inclined by an interaction between a dielectric anisotropy and an applied electric field. Accordingly, a ferroelectric liquid crystal device is expected to be widely utilized in a high speed and memory type display device, and particularly to provide a large-area, high resolution display because of its function.

In a liquid crystal device utilizing birefringence of a liquid crystal, the transmittance under right angle cross nicols is given by the following equation:

$$I/I_0 = \sin^2 4\theta a \cdot \sin^2(\Delta nd/\lambda),$$

wherein $I_0$: incident light intensity,

I: transmitted light intensity,

θa: apparent tilt angle as defined hereinafter,

Δn: refractive index anisotropy, d: thickness of the liquid crystal layer,

λ: wavelength of the incident light.

The apparent tilt angle θa in the above-mentioned non-helical structure is recognized as a half of an angle between the average molecular axis directions of liquid crystal molecules in a twisted alignment in a first orientation state and a second orientation state. According to the above equation, it is shown that an apparent tilt angle θa of 22.5 degrees provides a maximum transmittance and the apparent tilt angle θ in a non-helical structure for realizing bistability should desirably be as close as possible to 22.5 degrees.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that an apparent tile angle θa (a half of an angle between molecular axes in the two stable states) in a ferroelectric liquid crystal with a non-helical structure obtained by alignment with a rubbed polyimide alignment control film has become smaller as compared with a cone angle Ⓗ (the angle Ⓗ is a half of the apex angle of the cone 31 shown in FIG. 1 as described below) in the ferroelectric liquid crystal having a helical structure. Particularly, the apparent tilt angle θa in a ferroelectric liquid crystal with a non-helical structure obtained by alignment with rubbed polyimide alignment control films was found to be generally on the order of 3–8 degrees, and the transmittance at that time was at most about 3 to 5% (See, e.g., JP-A 3-252624).

In contrast thereto, the following knowledge has been obtained regarding conditions for providing a large apparent tilt angle θa of a chiral smectic liquid crystal in a non-helical structure and realizing a display capable of displaying high-contrast images.

More specifically, a display providing high-contrast images can be realized by a liquid crystal device comprising a chiral smectic liquid crystal and a pair of substrates holding therebetween the chiral smectic liquid crystal and having electrodes for applying a voltage to the chiral smectic liquid crystal on their opposing surfaces which have been provided with uniaxial alignment axes mutually intersecting at a prescribed angle, wherein the chiral smectic liquid crystal is placed in an alignment state providing a pretilt angle α, cone angle Ⓗ, and a smectic layer inclination angle δ satisfying following formulae (2) and (3); and the liquid crystal in the alignment state assumes at least two stable states providing optical axes forming an angle 2θa therebetween (θa: apparent tilt angle) satisfying the following formula (4) with respect to the cone angle Ⓗ of the chiral smectic liquid crystal:

$$Ⓗ < \alpha + \delta \tag{2}$$

$$\delta < \alpha \tag{3}$$

$$Ⓗ > \theta a > Ⓗ/2 \tag{4}$$

These points will be further described hereinbelow.

A smectic liquid crystal generally has a layer structure, of which the smectic layer thickness (generally called "layer spacing" in the art and the term "layer spacing" is also used herein) shrinks or decreases on transition from SmA phase to SmC phase or SmC* phase, so that the liquid crystal assumes a chevron structure as shown in FIG. 2, in which the liquid crystal or smectic layers 21 are bent at a mid point between the substrate surfaces 24a and 24b. The bending can occur in two directions, i.e., one in an alignment state 22 (C1 alignment state) which appears immediately after transition into SmC* from a higher temperature phase and the other in another alignment state 23 (C2 alignment state) appearing on further temperature decrease in mixture with the C1 alignment state.

It has been also found that, if a specific combination of an alignment film of a specific material or treated in a specific manner and a specific liquid crystal material is adopted, the above-mentioned transition from the C1 alignment state to the C2 alignment does not readily occur or the C2 alignment state does not occur at all depending on the liquid crystal material used, and an alignment state (hereinafter called "uniform state") providing two stable states of a high contrast appears in the C1 alignment state in addition to a conventionally found alignment state (hereinafter called "splay state") providing two stables accompanied with a twist between the two substrates and providing a low contrast therebetween. Particularly, in case where a high-pretilt alignment film (an alignment film capable of provide high pretilt angle) is used and a relationship of $(H)<\alpha+\delta$ (formula (2)) is satisfied, a very high contrast is attained in the C1 alignment whereas a lower contrast results in the C2 alignment state. From the above knowledge, it is expected to provide a higher quality of display device by using a high-pretilt alignment film and if the entire display area is uniformly placed in the C1 alignment so as to use the high-contrast two states for two extreme display states of so-called white and black.

It has concluded that the following conditions should be satisfied in order to realize the C1 alignment state without yielding the C2 alignment state. More specifically, the directors of liquid crystal molecules in the C1 alignment state and the C2 alignment state are disposed on cones 31 as shown in FIGS. 1A and 1B in the vicinity of a substrate surface. As is well known in the art, a liquid crystal molecule on a rubbed substrate surface raises its head in the direction A to form an angle $\alpha$ (called a "pretilt (angle)") with respect to the substrate surface. From the above, the following formulae (4) and (5) should be satisfied among the liquid crystal cone angle $(H)$, pretilt angle $\alpha$ and layer inclination angle $\delta$:

$$\text{For } C1 \text{ alignment, } (H)+\delta>\alpha \quad (5)$$

$$\text{For } C2 \text{ alignment, } (H)-\delta>\alpha \quad (6).$$

Accordingly, in order that the C1 alignment is developed without causing the C2 alignment, the relationship of $(H)-\delta<\alpha$ should be satisfied. This leads to $$(H)<\alpha+\delta \quad (2).$$

Further, the condition of formula (3) (i.e., $\alpha>\delta$) is given as a condition for easy switching from one orientation state to the other of a liquid crystal molecule at the substrate surface under application of an electric field.

Accordingly, in order to further stabilize the C1 alignment state, the formula (3) should be satisfied in addition to the formula (2).

As a result of further experiments under the conditions of the formulae (2) and (3), the increase in apparent tilt angle $\theta a$ from a conventional value of 3–8 degrees (obtained when the condition (2) or (3) is not satisfied) to 8–16 degrees has been confirmed, and a relationship of the following formula (4) has been empirically confirmed:

$$(H)>\theta a>(H)/2 \quad (4).$$

As described above, it has been clarified that a display capable of providing high-contrast images can be realized by satisfying the conditions of the above formulae (2)–(4) (see JP-A 3-252624 as described above).

It has been also found effective to form a liquid crystal device wherein the alignment control layers on a pair of substrates are provided with uniaxial alignment axes (typically by rubbing) which intersect each other at an intersection angle of 0–25 degrees in order to further stabilize the C1 alignment state and provide a better alignment characteristic.

As described above, a ferroelectric liquid crystal has potentially very excellent characteristics and has provided essential improvements to many of the problems encountered in conventional TN-liquid crystal devices, in combination with the conditions for adapting the liquid crystal molecular states to the device structures as described above. As a result, it is expected to be utilized in high-speed optical shutters and high-density, large area displays exceeding conventional TN-type liquid crystal displays and CRT displays.

However, as a liquid crystal panel is constituted in a larger area and at a higher resolution, the frame frequency (i.e., a drive frequency for forming one picture frame) is lowered. This leads to problems such as decreases in speeds of picture rewriting, smooth-scrolling on a graphic screen or motion picture displays, such as cursor movement. Some solutions to these problems have been disclosed in JP-A 60-31120, JP-A 1-140198, etc.

More specifically, a display apparatus may be constituted by a display panel comprising scanning electrodes and data electrodes arranged in a matrix, and drive means including means for selecting all or a prescribed number of scanning electrodes for so-called whole-area writing and means for selecting a part of the all or a prescribed number of scanning electrodes for a so-called partial writing, so that a partial motion picture display may be effected by the partial writing, and the partial writing and the whole-area writing are compromised.

As described above, it has been clarified that a large-area, high resolution display can be driven to provide high-contrast images at a high speed by driving a liquid crystal device (panel) in the above-mentioned display apparatus adapted for partial writing.

Extensive studies have been also made on liquid crystal materials having ferroelectricity so as to be adapted to liquid crystal devices and liquid crystal apparatus (inclusive of display apparatus) as described above. However, ferroelectric liquid crystal materials developed heretofore have not been fully satisfactory regarding the temperature dependence of response speed, low-temperature storability and alignment stability accompanying changes in drive conditions.

More specifically, if a display is used in a temperature range of ca. 5°–50° C., the environmental temperature surrounding the liquid crystal device can be expanded to ca. 5°–50° C. because of accumulation of heat evolved from the device per se. An ordinary ferroelectric liquid crystal generally causes a remarkably large temperature-dependent change in response speed because the response speed largely depends on the viscosity thereof so that the change in response speed reaches ten and several times corresponding to a temperature change in the range of 5°–50° C. This exceeds a controllable limit attainable by control of drive voltage, etc.

Further, in order to commercialize a large area display, an identical image display should be performed under identical conditions over a planar temperature distribution of several degrees to ten and several degrees, but liquid crystal materials available at present have a large temperature dependence of drive conditions and are not sufficient for such a commercial use. Particularly, an available liquid crystal material can be accompanied with a difficulty that, when it is heated or cooled in excess of an ordinary operational temperature range for, e.g., display and then cooled or heated to the ordinary operational temperature range, it can show drive characteristics which are different from those before the heating or cooling.

SUMMARY OF THE INVENTION

In view of the above-mentioned problems, an object of the present invention is to provide a liquid crystal composition having improved temperature-dependence of characteristics, such as response speed and alignment state, over a wide temperature range including room temperature region.

Another object of the present invention is to provide a liquid crystal device including such a liquid crystal composition in a stable alignment state and having drive conditions which are little dependent on temperature and include a high response speed and a good contrast over an operational temperature range.

A further object of the present invention is to provide a liquid crystal apparatus including such a liquid crystal device.

According to the present invention, there is provided a liquid crystal composition, successively assuming SmA (smectic A) phase and SmC* (chiral smectic) phase on temperature decrease, said liquid crystal composition having a temperature-dependence of layer spacing d in smectic phase such that the layer spacing d increases, is constant or decreases on temperature decrease in SmA phase temperature range, assumes a first transition point where the layer spacing d abruptly decreases on temperature decrease in vicinity of transition temperature from SmA phase to SmC* phase, and assumes a second transition point where the layer spacing d commences to increase on further temperature decrease below the first transition point in SmC* temperature range.

According to another aspect of the present invention, there is provided a liquid crystal device comprising a liquid crystal composition as described above between a pair of substrates.

According to a further aspect of the present invention, there is provided a liquid crystal apparatus including a liquid crystal device as described above and drive means therefor.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are illustrations of relationships among cone angle $\widehat{H}$, pretilt angle a and layer inclination angle δ in C1 alignment and C2 alignment, respectively.

FIG. 5 is a block diagram of a liquid crystal apparatus according to the invention and a graphic controller.

FIGS. 10–16 are respectively a graph showing a temperature-dependent layer spacing-changing in smectic phase of a liquid crystal composition or liquid crystal compositions used in Examples.

DESCRIPTION OF THE PREFERRED EMBODIMENTS

Figure 2:
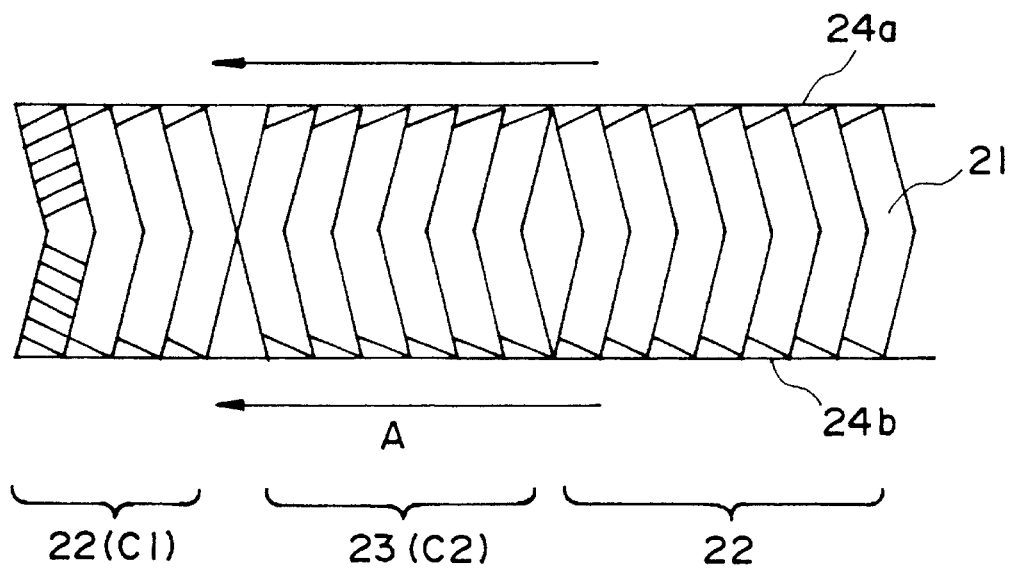
FIG. 2 is an illustration of a chevron layer structure including a C1 alignment portion and a C2 alignment portion.

According to our study, the following knowledge has been attained. In a liquid crystal composition, particularly a ferroelectric liquid crystal composition having SmC* phase, a liquid crystal composition can have a remarkably different temperature-dependence of response speed, particularly at a low temperature side in some cases, by changing a component liquid crystal compound with a similar compound having a slightly different side chain length, even if the viscosity coefficient and spontaneous polarization are not substantially changed. This phenomenon may be attributable to the temperature-dependence of the inclination angle of liquid crystal molecules and the layer spacing in the neighborhood of a temperature at which the temperature-dependence of response speed differs.

More specifically, it may be assumed that, when a phase transition occurs from SmA phase to SmC* phase on temperature decrease to change the layer spacing by inclination of liquid crystal molecules, liquid crystal molecules are excessively distorted to change the net magnitude in the substrate normal direction of the spontaneous polarization director, thereby excessively changing the effective interaction with an external electric field. If the inclination angle of liquid crystal molecules decreases on temperature decrease at a low temperature side where the temperature-dependence of response speed increases and there arises a shift to a tendency of increasing the layer spacing on temperature decrease to alleviate the distortion of liquid crystal molecules, the temperature-dependence of response speed can be remarkably improved compared with a composition of which the layer spacing continually decreases on temperature decrease.

In some cases, when a liquid crystal device containing a liquid crystal composition having the above-mentioned characteristic or liquid crystal display apparatus including such a liquid crystal device is heated to the SmA phase temperature range of the composition in excess of an ordinary operational temperature range and then cooled again to the ordinary operation temperature range, the display characteristics, such as contrast and display speed, can be different from those before the heating.

According to our study, it has been found that the above phenomenon is attributable to discontinuous changes in layer spacing and alignment state at the time of transition from SmC* phase to SmA phase, thus resulting in changes in structural parameters, such as cone angle $\widehat{H}$ and layer inclination angle δ. If the change in layer spacing accompanying the transition from SmC* phase to SmA phase can be suppressed, it is assumed that the changes in cone angle $\widehat{H}$ and layer inclination angle δ can be reduced, thereby realizing a liquid crystal device or a display apparatus of which the display characteristics do not vary readily.

As a result of further study based on the above knowledge, it has been found that the temperature-dependence of layer spacing d of a liquid crystal composition assuming SmC* phase can be varied by selecting the skeleton structure and side chains of the component compounds and combining them at different proportions. Based on the knowledge, a further study was made on the relationship between the change in layer spacing and the temperature-dependent changes in performances of liquid crystal compositions. It has been found possible to provide a liquid crystal composition, particularly one assuming a chevron-structured liquid crystal phase, with a suppressed change in structural parameters accompanying the phase transition and a particularly improved temperature-dependence of response speed over a wide temperature range by selecting a liquid crystal composition which causes a successive phase transition from SmA phase to SmC* phase on temperature decrease, has a first transition point (temperature) where the layer spacing d decreases abruptly, e.g., discontinuously in the vicinity of the SmA to SmC* phase transition temperature, and also has a second transition point (temperature) where the layer spacing d further decreases and turns to increase on further temperature decrease in the SmC* temperature range. Such a liquid crystal composition can provide a liquid crystal device, such as a liquid crystal display device, showing improved temperature characteristics, such as contrast.

The liquid crystal composition according to the present invention may preferably have a smectic layer spacing d in SmA which increases or is constant on temperature decrease so as to provide improved high temperature characteristics and particularly a further stabilized liquid crystal alignment state even when heated to the SmA phase temperature range and stored at a higher temperature exceeding the SmC* temperature range, thus providing characteristics with good reproducibility at normal temperature.

The liquid crystal composition according to the present invention may preferably have a layer spacing-changing characteristic that it has a layer spacing $d_A$ at the first transition point and a layer spacing $d_{min}$ at the second transition point satisfying:

$$0.966 \leq d_{min}/d_A \quad (7),$$

more preferably $$0.976 < d_{min}/d_A < 0.990 \quad (8).$$

Incidentally, in case where the layer spacing d does not have a clear flexural point or a discontinuous change but changes in a curve in the vicinity of the transition point from SmA phase to SmC* phase, d at the SmA→SmC* transition temperature is taken as $d_A$.

An improved drive characteristic over a wide temperature range is accomplished particularly when the layer spacing d increases or is constant in SmA phase and the formula (8) holds true.

More specifically, it is preferred that the liquid crystal composition according to the present invention successively assumes SmA phase and SmC* phase, has a layer spacing d in smectic phase which increase, decreases or is constant on temperature decrease in SmA phase, has a first transition point where d abruptly decreases on temperature decrease in the vicinity of a transition point from SmA to SmC*, a second transition point where d turns to increase in SmC* phase on further temperature decrease after passing the first transition point and further a third transition point where d again turns to decrease on a low temperature side than the second transition point.

A liquid crystal composition having such a temperature-dependent layer spacing-changing characteristic including a third transition point may have further improved temperature characteristics, such as temperature-dependence of response speed, on a low temperature side, and stable characteristics, such as response speed, contrast and alignment state, after storage at a low temperature.

In order to provide a liquid crystal device having little temperature-dependence of response speed over a wider temperature range and capable of driving at a higher speed, the layer spacing $d_{min}$ at the second transition point and the layer spacing $d_A$ at the first transition point may preferably satisfy $0.966 \leq d_{min}/d_A \ldots$ (7), more preferably $$0.978 < d_{min}/d_A \quad (9)$$

in case where the third transition point exhibits.

The liquid crystal composition, particularly one having the third transition point, may preferably have the second transition point in SmC* phase in the temperature range of 20°–50° C., more preferably 30°–50° C.

In order to provide little temperature-dependence of drive characteristics and little change in the above-mentioned apparent tilt angle θa, contrast and response speed even after storage at a temperature which is lower than an ordinarily expected storage temperature range if the storage is performed for several hours, the liquid crystal composition may preferably have a temperature-dependence of layer spacing d such that it assumes a minimum layer spacing $d_c$ in a range from the third transition point to the phase transition temperature to a lower temperature phase than SmC* which satisfies the following relationship with the layer spacing $d_A$ at the first transition point:

$$d_c/d_A \leq 1.003 \quad (10).$$

As mentioned above, in case where the layer spacing d does not have a clear flexure point but changes in a curve in the vicinity of the phase transition temperature from SmA phase to SmC* phase, d at the phase transition temperature is taken as $d_A$.

Further, in order to retain little change in contrast and response speed even after storage for long hours at temperature lower than an ordinarily expected storage temperature range and even after recovery at a sufficiently high temperature-raising speed after storage at such a low temperature, the liquid crystal composition may preferably have a layer spacing $d_{max}$ at the third transition temperature which satisfies the following relationship with the layer spacing $d_A$ at the first transition point:

$$0.993 \leq d_{max}/d_A \leq 1.003 \quad (11).$$

In addition to the above-mentioned first, second and third transition points and the formulae (10) and (11) regarding the layer spacings at such points, the liquid crystal composition may preferably satisfy the formula (7), more preferably the formula (9), between $d_{min}$ and $d_A$ and have the second transition point providing $d_{min}$ within the range of 20°–50° C., more preferably 30°–50° C., in order to provide a liquid crystal device with little temperature-dependence of response speed and higher-speed drive characteristic.

The liquid crystal composition having a layer spacing-changing characteristic according to the present invention may have a temperature characteristic of cone angle ⒽH in SmC* phase such that ⒽH increases on temperature decrease in SmC* temperature range and assumes a maximum ⒽH$_{max}$ at a transition point below which ⒽH turns to decrease.

On the other hand, if the liquid crystal composition having the first and second transition points is cooled below an operational temperature range for display, the layer spacing d can exceed the layer spacing $d_A$ at the first transition on a lower temperature side in the SmC* phase in some cases.

When a liquid crystal device containing such a liquid crystal composition is stored below a temperature (hereinafter denoted as $Td_B$) at which d reaches $d_A$, the liquid crystal cannot recover the original characteristics, such as the alignment state, apparent tilt angle θa, contrast and response speed even when it is re-heated to an operational temperature for display in some cases. This can pose a serious problem for storage or use of a liquid crystal composition or a liquid crystal device.

This is presumably because, whereas an increase or decrease in layer spacing d in a layer structure can be absorbed by increasing or decreasing the inclination angle at a temperature below the first point, a further increase in layer spacing exceeding $d_A$ cannot be absorbed any more at a lower temperature, so that the layer structure per se can be deformed or damaged and the original layer structure is not restored by re-heating to change the drive or display characteristics.

A liquid crystal composition can be stably present in a super-cooled state when it is contained in a cell, so that it does not cause crystallization or local crystallization even below its melting point in the bulk state.

Accordingly, the lower limit temperature for storage may be determined by the above-mentioned $Td_B$ rather than the melting point.

As a result of further study for minimizing the temperature-dependence of drive conditions and removing the adverse effect accompanying the low temperature storage described above, we have found that these objects can be accomplished by using a liquid crystal composition of which the layer spacing d does not exceed $d_A$ even when cooled below the second transition temperature in SmC* phase. Incidentally, the orderly layer structure of a liquid crystal composition retains some flexibility different from that of a crystal system, so that a $d_{max}$ in excess of $d_A$ does not damage the layer structure in some cases. On the other hand, too low a $d_{max}/d_A$ value can result in a remarkably slow response speed at low temperatures, thus failing to accomplish the object of stable drive characteristics over a wide temperature range.

In the process of the above-mentioned study, it has been found that the temperature-dependent layer spacing-changing characteristic of a liquid crystal composition can remarkably change depending on the skeleton structures and length of side chains of the components, their combination, and proportions of the components. However, a particular rule cannot be found regarding the low-temperature behavior in question. Accordingly, it has been clarified that the adverse effects accompanying the low temperature storage are alleviated selecting, from numerous compositions considered, a liquid crystal composition having a layer spacing d which abruptly decreases in the neighborhood of the SmA→SmC* phase transition temperature, turns to increase below a lower temperature on further temperature decrease, and then turns to decrease below a further low temperature on further temperature decrease.

Figure 3:
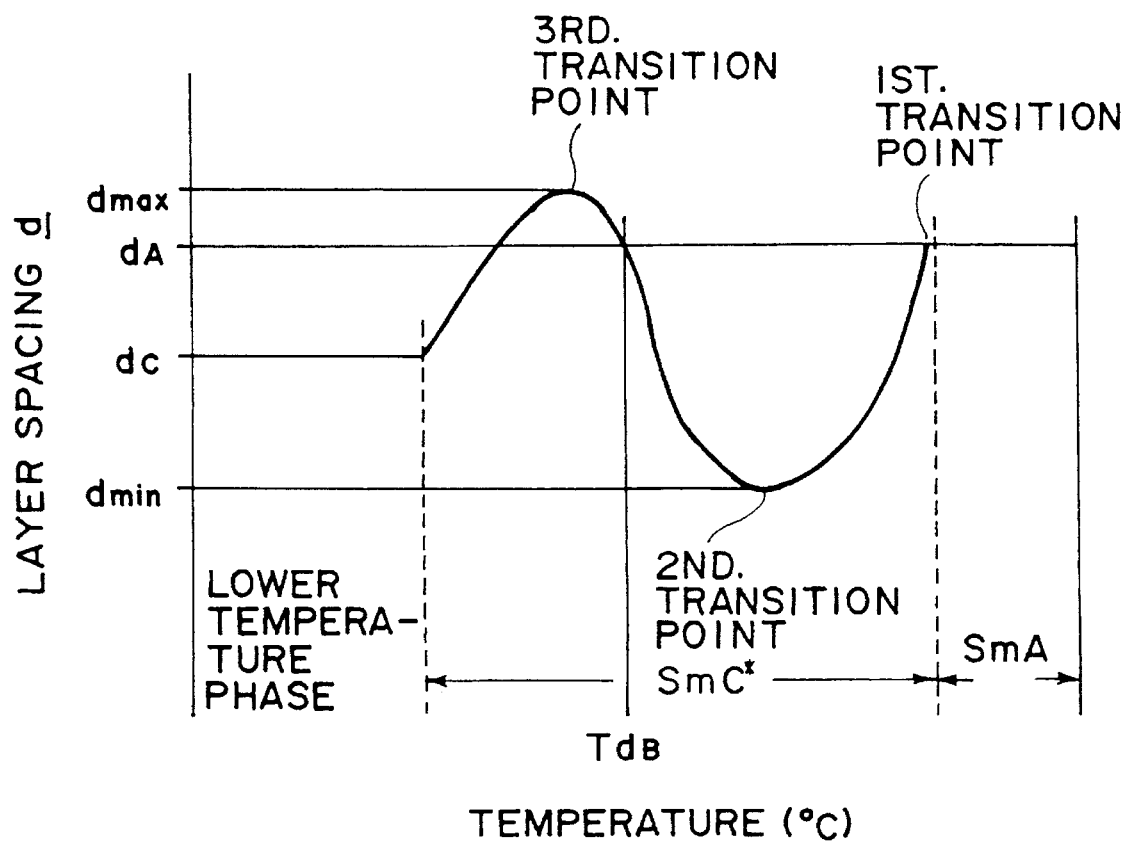
FIG. 3 is a graph showing an example of temperature-dependent layer spacing-changing characteristic in SmC* phase.

FIG. 3 shows an example of a temperature-dependence of layer spacing d of a liquid crystal composition having such first, second and third transition points. Based on such a temperature characteristic, the characteristics, such as response speed and display contrast of a liquid crystal composition, can be further improved by adjusting the relationship among $d_A$, $d_{min}$, $d_c$ and $d_{max}$ and the change of d between the first and second transition points, and between the second and third transition points.

The liquid crystal composition according to the present invention comprises at leas one mesomorphic compound and is provided with SmA phase and SmC* phase and the above-mentioned smectic layer spacing-changing characteristic having the first and second transition points by adjusting the mesogen groups and combination thereof for providing skeleton structures, kinds and lengths of side chains, and compositional ratios among the components. More specifically, the liquid crystal composition may comprise at least one mesomorphic compound, such as phenylpyrimidine compounds and thiazole compounds. In order to realize the above-mentioned temperature characteristic of layer spacing d described above, it is preferred to incorporate at least one species of indan compounds represented by the following formula (A):

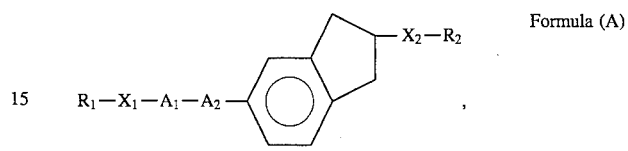

wherein $R_1$ and $R_2$ independently denote a linear or branched alkyl group having 1–18 carbon atoms; $X_1$ and $X_2$ independently denote a single bond, —O—, —CO.O—, or —O.CO—; $A_1$ denotes a single bond,

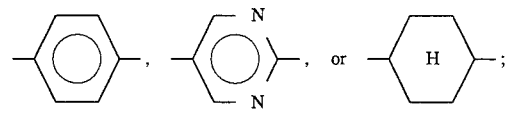

$A_2$ denotes

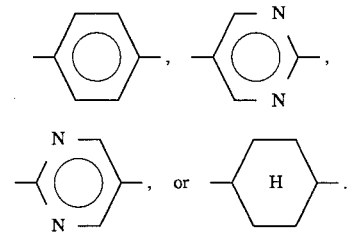

Preferred examples of the indan compound represented by the formula (A) may include those listed in the following Table 1, wherein the abbreviations represent the following side chain groups and ring groups:

met=$CH_3$, hep=$C_7H_{15}$, trt=$C_{13}H_{27}$, eth=$C_2H_5$,
oct=$C_8H_{17}$, tet=$C_{14}H_{29}$, pro=$C_3H_7$,
non=$C_9H_{19}$, ped=$C_{15}H_{31}$, but=$C_4H_9$,
dec=$C_{10}H_{21}$, hexd=$C_{16}H_{33}$, pen=$C_5H_{11}$,
und=$C_{11}H_{23}$, hepd=$C_{17}H_{35}$, hex=$C_6H_{13}$,
dod=$C_{12}H_{25}$, ocd=$C_{18}H_{37}$, 2mb=2-methylbutyl,

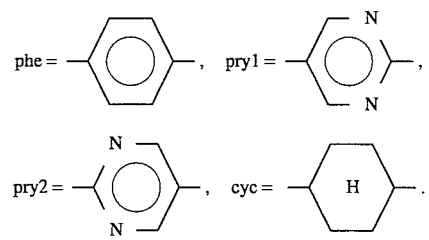

TABLE 1

| $R_1$— | —$X_1$— | —$A_1$— | —$A_2$— | —$X_2$— | —$R_2$ |
|---|---|---|---|---|---|
| met- | — | — | -phe- | — | -pro |
| pen- | — | — | -phe- | — | -dec |

TABLE 1-continued

| $R_1$— | —$X_1$— | —$A_1$— | —$A_2$— | —$X_2$— | —$R_2$ |
|---|---|---|---|---|---|
| hex- | — | — | -pry1- | — | -oct |
| dec- | — | — | -pry1- | — | -oct |
| dec- | — | — | -pry1- | — | -dod |
| dec- | — | — | -pry1- | — | -tet |
| und- | — | — | -pry1- | — | -hep |
| und- | — | — | -pry1- | — | -oct |
| dod- | — | — | -pry1- | — | -dec |
| dod- | — | — | -pry1- | — | -dod |
| tet- | — | — | -phe- | — | -dec |
| pro- | —COO— | — | -cyc- | — | -dec |
| pen- | —OOC— | — | -cyc- | — | -dec |
| pen- | —COO— | -cyc- | -phe- | — | -hep |
| oct- | —O— | — | -pry1- | — | -oct |
| pen- | — | -pry1- | -phe- | — | -hex |
| hep- | — | -pry1- | -phe- | — | -hex |
| hex- | — | -pry1- | -phe- | — | -pen |
| hex- | — | -pry1- | -phe- | — | -hep |
| oct- | — | -phe- | -phe- | —O— | -oct |
| dec- | —COO— | — | -phe- | — | -oct |
| dec- | —COO— | — | -pry1- | — | -oct |
| und- | — | -phe- | -pry2- | — | -hep |
| dec- | —O— | — | -pry1- | — | -oct |
| dod- | — | — | -phe- | —COO— | -oct |
| dod- | — | — | -phe- | —OOC— | -hep |
| dec- | — | — | -pry1- | — | -hep |
| und- | — | -phe- | -pry1- | — | -oct |
| non- | — | -phe- | -cyc- | — | -hex |
| 2mb- | —O— | — | -phe- | — | -hep |
| tet- | — | -phe- | -phe- | — | -hep |
| ocd- | — | -phe- | -phe- | — | -oct |
| dec- | — | — | -phe- | —O— | -2mb |

In order for the liquid crystal composition according to the present invention to acquire a layer spacing-changing characteristic that the layer spacing increases or is constant on temperature decrease in SmA phase in addition to the first and second transition points, the liquid crystal composition may preferably contain at least one species of quinoxaline compounds represented by the following formula (B) in addition to the indan compound of the formula (A):

Formula (B)

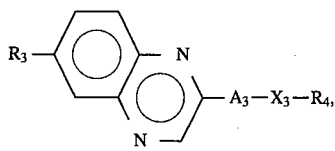

wherein $R_3$ and $R_4$ independently, denote a linear or branched alkyl grope having 1–18 carbon atoms; $X_3$ denotes a single bond, —O—, —CO.O— or —O.CO—; and $A_3$ denotes

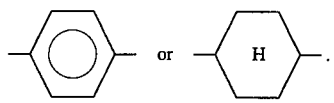

Preferred examples of the quinoxaline compound represented by formula (B) may include those listed in the following Table 2, wherein the abbreviations represent the following side chain groups and ring groups:

met=$CH_3$, hep=$C_7H_{15}$, trt=$C_{13}H_{27}$, eth=$C_2H_5$,
oct=$C_8H_{17}$, tet=$C_{14}H_{29}$, pro=$C_3H_7$,
non=$C_9H_{19}$, ped=$C_{15}H_{31}$, but=$C_4H_9$,
dec=$C_{10}H_{21}$, hexd=$C_{16}H_{33}$, pen=$C_5H_{11}$,
und=$C_{11}H_{23}$, hepd=$C_{17}H_{35}$, hex=$C_6H_{13}$,
dod=$C_{12}H_{25}$, ocd=$C_{18}H_{37}$, 2mb=2-methylbutyl,

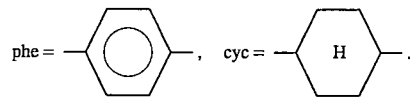

TABLE 2

| $R_3$— | —$A_3$— | —$X_3$— | —$R_4$ |
|---|---|---|---|
| met- | -phe- | — | -but |
| pro- | -phe- | — | -hex |
| hex- | -phe- | — | -oct |
| oct- | -phe- | — | -oct |
| dec- | -phe- | — | -oct |
| und- | -phe- | — | -dec |
| dod- | -phe- | — | -dec |
| tet- | -phe- | — | -dec |
| ocd- | -phe- | — | -dec |
| dec- | -phe- | — | -dec |
| oct- | -phe- | — | -dec |
| hex- | -phe- | —O— | -dec |
| oct- | -phe- | —O— | -dec |
| dec- | -phe- | —O— | -dec |
| hex- | -phe- | — | -dec |
| oct- | -phe- | — | -dod |
| oct- | -phe- | — | -ocd |
| hex- | -phe- | —COO— | -oct |
| oct- | -phe- | —COO— | -oct |
| dec- | -phe- | —COO— | -oct |
| hex- | -phe- | —OOC— | -oct |
| oct- | -phe- | —OOC— | -oct |
| dec- | -phe- | —OOC— | -oct |
| hex- | -cyc- | — | -und |
| oct- | -cyc- | — | -und |
| dec- | -cyc- | — | -dod |
| dod- | -cyc- | — | -dod |
| 2mb- | -phe- | — | -oct |

In order to provide the liquid crystal composition according to the present invention with the third transition point in addition to the first and second transition point, it is preferred to incorporate a coumaran compound represented by the formula (C) in addition to the indan compound of the formula (A):

Formula (C)

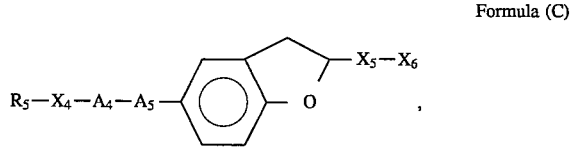

wherein $R_5$ and $R_6$ independently denote a linear or branched alkyl group having 1–18 carbon atoms; $X_4$ and $X_5$ independently denote a single bond, —O—, —CO.O— or —O.CO—; $A_4$ denotes a single bond,

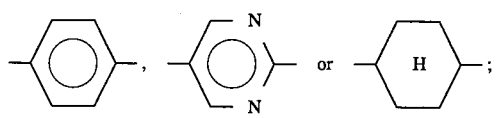

$A_5$ denotes

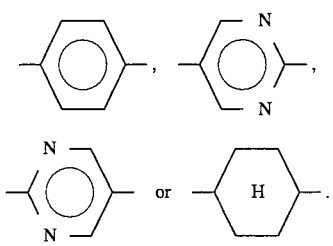

Preferred examples of the coumaran compound of the formula (C) may include those listed in the following Table 3, wherein the abbreviations represent the following side chain groups and ring groups:

met=$CH_3$, hep=$C_7H_{15}$, trt=$C_{13}H_{27}$, eth=$C_2H_5$, oct=$C_8H_{17}$, tet=$C_{14}H_{29}$, pro=$C_3H_7$, non=$C_9H_{19}$, ped=$C_{15}H_{31}$, but=$C_4H_9$, dec=$C_{10}H_{21}$, hexd=$C_{16}H_{33}$, pen=$C_5H_{11}$, und=$C_{11}H_{23}$, hepd=$C_{17}H_{35}$, hex=$C_6H_{13}$, dod=$C_{12}H_{25}$, ocd=$C_{18}H_{37}$, 2mb=2-methylbutyl,

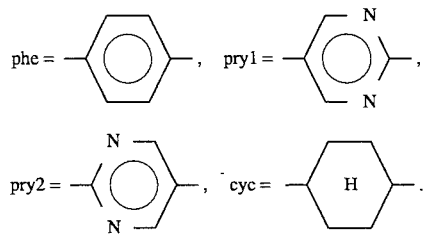

TABLE 3

| $R_5-$ | $-X_4-$ | $-A_4-$ | $-A_5-$ | $-X_5-$ | $-R_6$ |
|---|---|---|---|---|---|
| met- | — | — | -phe- | — | -pro |
| pen- | — | — | -phe- | — | -dec |
| hex- | — | — | -pry- | — | -oct |
| dec- | — | — | -pry1- | — | -oct |
| dec- | — | — | -pry1- | — | -dod |
| dec- | — | — | -pry1- | — | -tet |
| und- | — | — | -pry1- | — | -hep |
| und- | — | — | -pry1- | — | -oct |
| dod- | — | — | -pry1- | — | -dec |
| dod- | — | — | -pry1- | — | -dod |
| tet- | — | — | -phe- | — | -ocd |
| pro- | —COO— | — | -cyc- | — | -dec |
| pen- | —OOC— | — | -cyc- | — | -dec |
| pen- | —COO— | -cyc- | -phe- | — | -hep |
| oct- | —O— | — | -pry1- | — | -oct |
| dec- | — | -pry1- | -phe- | — | -met |
| pen- | — | -pry1- | -phe- | — | -hex |
| hep- | — | -pry1- | -phe- | — | -hex |
| hex- | — | -pry1- | -phe- | — | -pen |
| hex- | — | -pry1- | -phe- | — | -hep |
| dod- | — | -phyl- | -phe- | — | -oct |
| oct- | — | -phe- | -phe- | —O— | -oct |
| dec- | —COO— | — | -phe- | — | -oct |
| dec- | —COO— | — | -pry1- | — | -oct |
| und- | — | -phe- | -pry2- | — | -hep |
| dec- | —O— | — | -pry1- | — | -oct |
| dod- | — | — | -phe- | —COO— | -oct |
| dod- | — | — | -phe- | —OOC— | -hep |
| dec- | — | — | -pry1- | — | -hep |
| und- | — | -phe- | -pry1- | — | -oct |
| non- | — | -phe- | -cyc- | — | -hex |
| 2mb- | — | -pry1- | -phe- | — | -hep |
| tet- | — | — | -phe- | -phe- | -hex |

TABLE 3-continued

| $R_5-$ | $-X_4-$ | $-A_4-$ | $-A_5-$ | $-X_5-$ | $-R_6$ |
|---|---|---|---|---|---|
| ocd- | — | -phe- | -phe- | — | -hep |
| dec- | — | — | -phe- | —O— | -2mb |

The liquid crystal composition according to the present invention may preferably contain at least one species each of the indan compound of the formula (A), the quinoxaline compound of the formula (B) and/or the coumaran compound of the formula (C) in a proportion of 1–30 wt. %, preferably 5–30 wt. %, further preferably 8–25 wt. %, respectively.

The liquid crystal composition according to the present invention may be formulated by incorporating as desired one or more species of other mesomorphic compounds, e.g., represented by the following formulae (D)–(H):

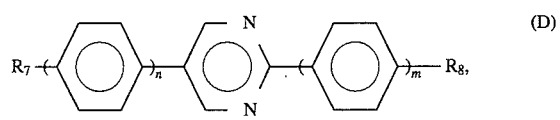

wherein n and m are independently 0, 1 or 2 satisfying $0<n+m\leq2$; $R_7$ and $R_8$ independently denote hydrogen, halogen, CN or a linear, branched or cyclic alkyl group having 1–18 carbon atoms wherein one or more methylene groups can be replaced with —O—, —S—, —CO—, —CHW— (W=halogen, CN or $CF_3$), —CH=CH— or —C≡C— with the proviso that two hetero-atoms cannot be adjacent to each other, and $R_7$ and $R_8$ can be optically active.

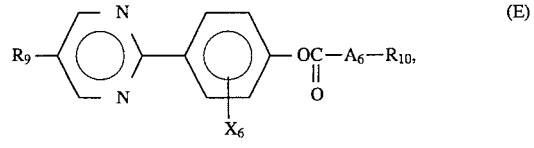

wherein $A_6$ denotes

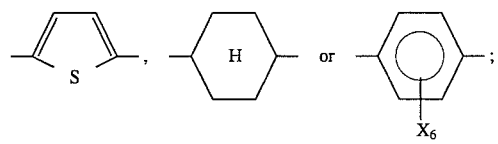

$X_6$ denotes hydrogen or fluoride; $R_9$ and $R_{10}$ independently denote hydrogen, halogen CN or a linear, branched or cyclic alkyl group having 1–18 carbon atoms wherein one or more methylene groups can be replaced with —O—, —S—, —CO—, —CHW— (W=halogen, CN or $CF_3$), —CH=CH— or —C≡C— with the proviso that two hetero-atoms cannot be adjacent to each other, and $R_9$ and $R_{10}$ can be optically active.

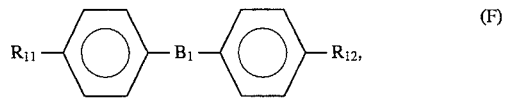

wherein $B_1$ denotes

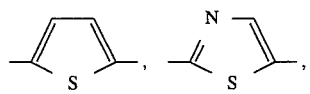

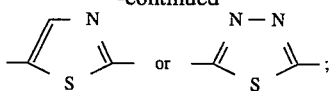

and $R_{11}$ and $R_{12}$ independently denote hydrogen, halogen, CN or a linear, branched or cyclic alkyl group having 1–18 carbon atoms wherein one or more methylene groups can be replaced with —O—, —S—, —CO—, —CHW— (W=halogen, CN or $CF_3$), —CH=CH— or —C≡C— with the proviso that two hetero-atoms cannot be adjacent to each other, and $R_{11}$ and $R_{12}$ can be optically active.

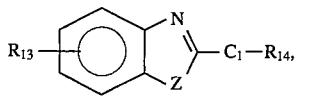 (G)

wherein $C_1$ denotes

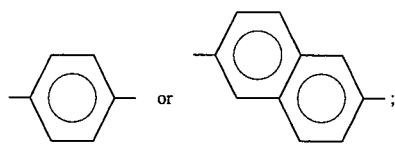

Z or denotes —O— or —S—; $R_{13}$ and $R_{14}$ independently denote hydrogen, halogen, CN or a linear, branched or cyclic alkyl group having 1–18 carbon atoms wherein one or more methylene groups can be replaced with —O—, —S—, —CO—, —CHW— (W=halogen, CN or $CF_3$), —CH=CH— or —C≡C— with the proviso that two hetero-atoms cannot be adjacent to each other, and $R_{13}$ and $R_{14}$ can be optically active.

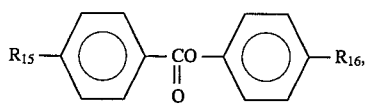 (H)

wherein $R_{15}$ and $R_{16}$ independently denote hydrogen, halogen, CN or a linear, branched or cyclic alkyl group having 1–18 carbon atoms wherein one or more methylene groups can be replaced with —O—, —S—, —CO—, —CHW— (W=halogen, CN or $CF_3$), —CH=CH— or —C≡C— with the proviso that two hetero-atoms cannot be adjacent to each other, and $R_{15}$ and $R_{16}$ can be optically active.

Preferred structural examples of the compounds of the formulae (D)–(G) may include those enumerated hereinbelow.

Preferred Examples of Formula (D)

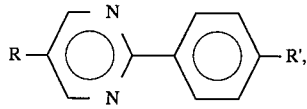

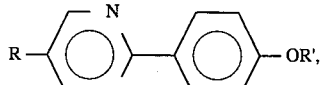

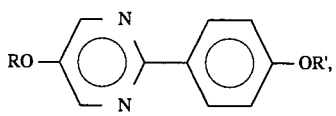

Perferred Examples of Formula (E)

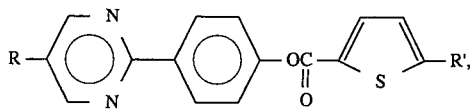

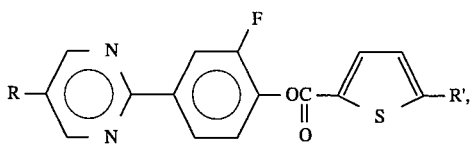

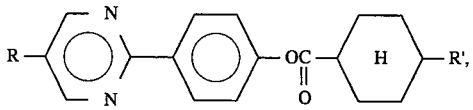

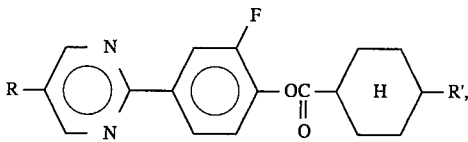

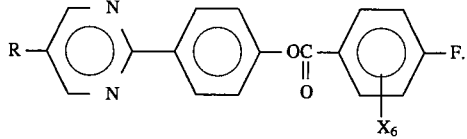

Preferred Examples of Fromula (F)

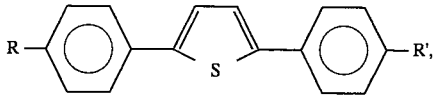

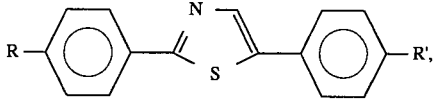

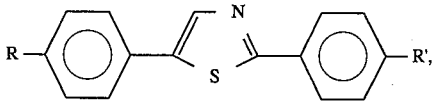

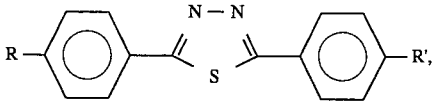

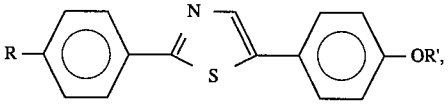

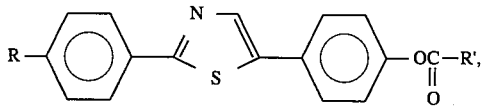

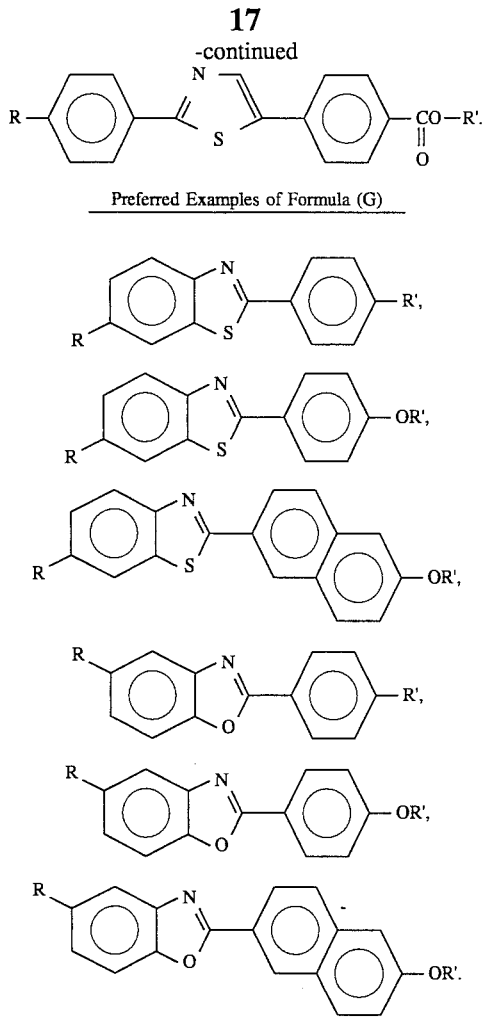

Preferred Examples of Formula (G)

In the above formulae, R and R' independently denote hydrogen, halogen, CN or a linear, branched or cyclic alkyl group having 1–18 carbon atoms wherein one or more methylene groups can be replaced with —O—, —S—, —CO—, —CHW— (W=halogen, CN or CF$_3$), —CH=CH— or —C≡C— with the proviso that two hetero-atoms cannot be adjacent to each other, and R and R' can be optically active; and X$_6$ denotes hydrogen or fluorine.

It is preferred that the mesomorphic compounds represented by the formulae (D)–(H) constitute in total at least 30 wt. %, more preferably 50–90 wt. %, of the liquid crystal composition according to the present invention.

Figure 4:
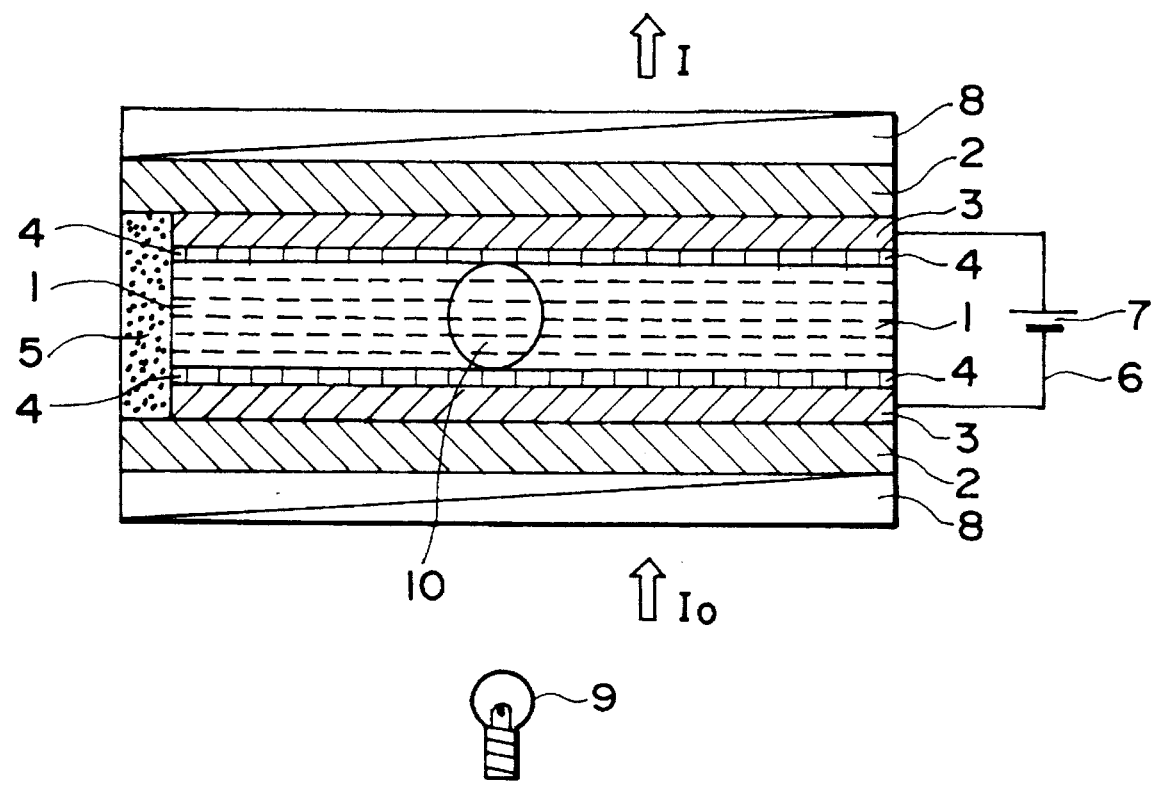
FIG. 4 is ia sectional view of an embodiment of a liquid crystal device according to the invention.

FIG. 4 is a schematic sectional view of an embodiment of the liquid crystal device using a chiral smectic liquid crystal layer for describing a structure of the liquid crystal device utilizing ferroelectricity.

Referring to FIG. 4, the liquid crystal device includes a chiral smectic liquid crystal layer 1 disposed between a pair of glass substrates 2 each having thereon a transparent electrode 3 and an alignment control layer 4. Lead wires 6 are connected to the electrodes 3 so as to apply a driving voltage to the liquid crystal layer 1 from a power supply 7. Outside the substrates 2, a pair of polarizers 8 are disposed so as to modulate incident light I$_0$ from a light source 9 in cooperation with the liquid crystal 1 to provide modulated light I.

Each of two glass substrates 2 is coated with a transparent electrode 3 comprising a film of In$_2$O$_3$, SnO$_2$ or ITO (indium-tin-oxide) to form an electrode plate. Further thereon, an alignment control layer 4 is formed by rubbing a film of a polymer such as polyimide with gauze or acetate fiber-planted cloth so as to align the liquid crystal molecules in the rubbing direction. Generally, it is possible to compose the alignment control layer from an insulating material including an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and also an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Such an alignment control layer can be composed of two layers. Alternatively, it is also possible to use a single layer of inorganic insulating alignment control layer or organic insulating alignment control layer. An inorganic alignment control layer may be formed by vapor deposition, while an organic alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The inorganic insulating layer may have a thickness of ordinarily 30 Å1 μm, preferably 40–3000 Å, further preferably 40–1000 Å.

The two glass substrates 2 with transparent electrodes 3 and further with alignment control layers 4 thereof are held to have a prescribed (but arbitrary) gap with a spacer 10 and a sealing member 5. For example, such a cell structure with a prescribed gap may be formed by sandwiching spacers 10 of silica beads or alumina beads having a prescribed diameter with two glass plates, and then sealing the periphery thereof with an sealing member 5 of, e.g., an epoxy adhesive. Alternatively, a polymer film or glass fiber may also be used as a spacer. Between the two glass plates, a chiral smectic liquid crystal is sealed up to provide a liquid crystal layer in a thickness of generally 0.5 to 20 μm, preferably 1 to 5 μm.

It is desired that the liquid crystal 1 has an SmC* phase (chiral smectic C phase) in a broad temperature range including room temperature, particular at a lower temperature side thereof, and provides a device showing a broad drive voltage margin and a broad drive temperature margin.

Further, in order to show a monodomain state in a good alignment characteristic in a device, it is preferred that the liquid crystal has a phase transition series of isotropic–Ch (cholesteric) phase–SmA (smectic A) phase–SmC* (chiral smectic C) phase.

The transparent electrodes 3 are connected to the external power supply 7 through the lead wires 6. Further, outside the glass substrates 2, polarizers 8 are applied. Behind the polarizer 8 is disposed optionally a light source 9.

The liquid crystal device according to the present invention may be provided with improved characteristics inclusive of a contrast by appropriately adjusting the device manufacturing conditions, such as a cell gap (liquid crystal layer thickness) between the substrates, and materials and rubbing conditions for the alignment control layer in combination with the liquid crystal composition according to the invention so as to satisfy the above-mentioned formulae (2), (3) and (4).

In a specific example, an embodiment of liquid crystal device having a structure similar to that shown in FIG. 4 was prepared in the following manner.

Two 1.1 mm-thick glass plates as substrates 2 were respectively provided with transparent stripe electrodes 3 of ITO (indium tin oxide) together with side metal electrodes (not shown) of molybdenum and was further coated thereon with a 1500 Å-thick transparent dielectric film of tantalum oxide (not shown) by sputtering.

Onto the tantalum oxide film, an NMP solution of a polyimide precursor (e.g., "LQ-1802", mfd. by Hitachi Kasei K.K.; "LP-64" mfd. by Toray K.K., and "RN-305" mfd. by Nissan Kagaku K.K.) was applied by a printing method and baked at 200°–270° C. to form a 100 to 300 Å-thick polyimide alignment control film 4. After the baking, the film 4 was rubbed with an acetate fiber yarn-planted cloth. The pretilt angle may be controlled by appropriately selecting and combining the rubbing intensity governed by the rubbing cloth rotation speed and substrate feed speed and the polyimide alignment film materials.

Thus, the two substrates were treated in the above-described manner. Then, on one substrate, epoxy resin adhesive particles having an average particle size of 5.5 μm ("Toraypearl" mfd. by Toray K.K.) were dispersed at a density of 50 particles/mm² according to the Nordson electrostatic dispersion scheme. On the other substrate, silica microbeads having an average particle size of 1.2 μm was dispersed as spacers 10 at a density of 300 particles/mm² by the Nordson electrostatic dispersion scheme. Then, onto one substrate, a liquid epoxy adhesive ("STRUCT BOND", mfd. by Mitsui Toatsu Kagaku K.K.) was applied by printing in a thickness of 6 μm. Then, the two substrates were applied to each other so that their rubbing directions were disposed in almost identical directions but with an anticlockwise intersection angle of 0–10 degrees and press-bonded to each other under a pressure of 2.8 kg/cm² for 5 min. at 70° C., followed by heating at 150° C. under a pressure of 0.623 kg/cm² for 4 hours to cure the two types of adhesives, thereby preparing a blank cell.

Then, the cell was evacuated to a reduced pressure of $10^{-4}$ atm and filled with a ferroelectric liquid crystal composition heated to its isotropic phase to provide a liquid crystal cell.

The liquid crystal cell thus prepared may be sandwiched between a pair of polarizers 8 and driven by application of drive voltages from an external voltage supply 7 as illustrates in FIG. 4.

A liquid crystal device according to the present invention may preferably be used to constitute a display apparatus in combination with a drive circuit and a light source.

Figure 6:
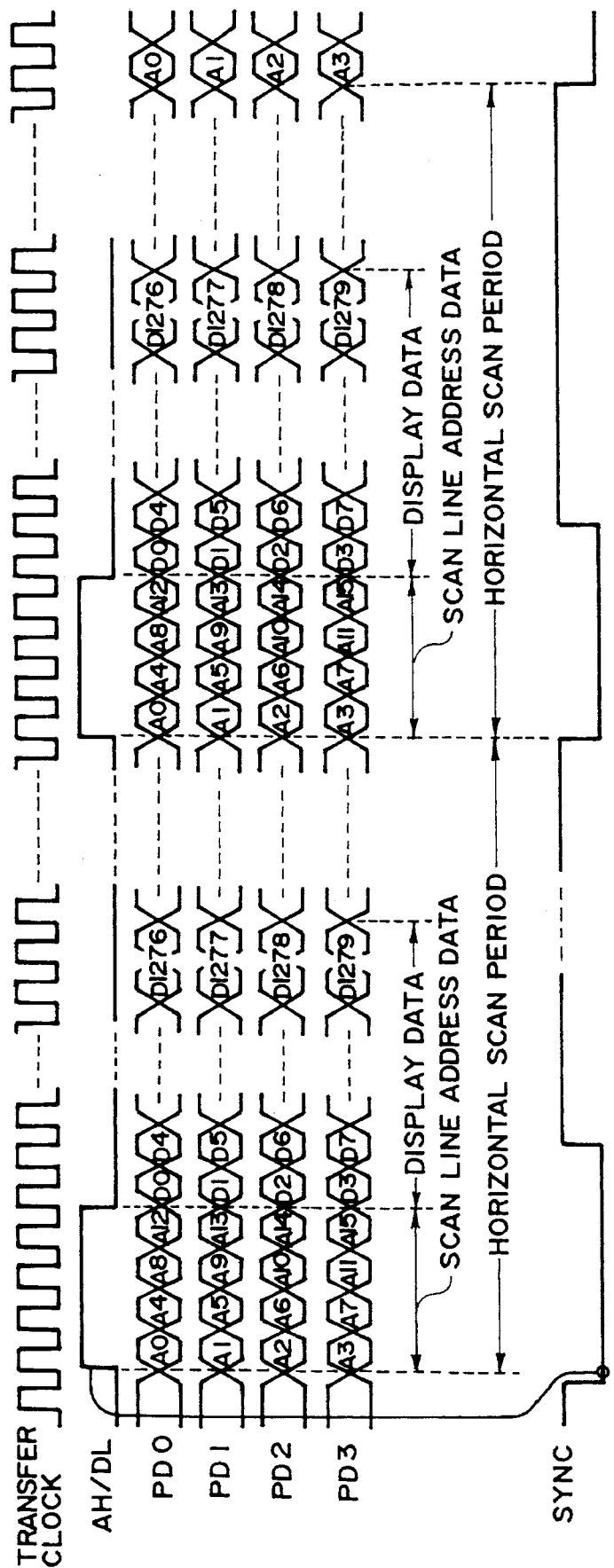
FIG. 6 is a time chart showing time correlation for image data communication between the liquid crystal apparatus and the graphic controller.

More specifically, a liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 5 and 6.

Image data are generated in a graphic controller 52 in an apparatus body and transferred to the display panel 53 (illuminated with a backlight (not shown)) by signal transfer means shown in FIGS. 5 and 6. The graphic controller 52 principally comprises a CPU (or GCPU, central processing unit) 512 and a VRAM (video-RAM, image data storage memory) 514 and is in charge of management and communication of image data between a host CPU 513 and the liquid crystal display apparatus (FLCD) 51. The control of image display according to the present invention is principally accomplished by the graphic controller 52.

Figure 7:
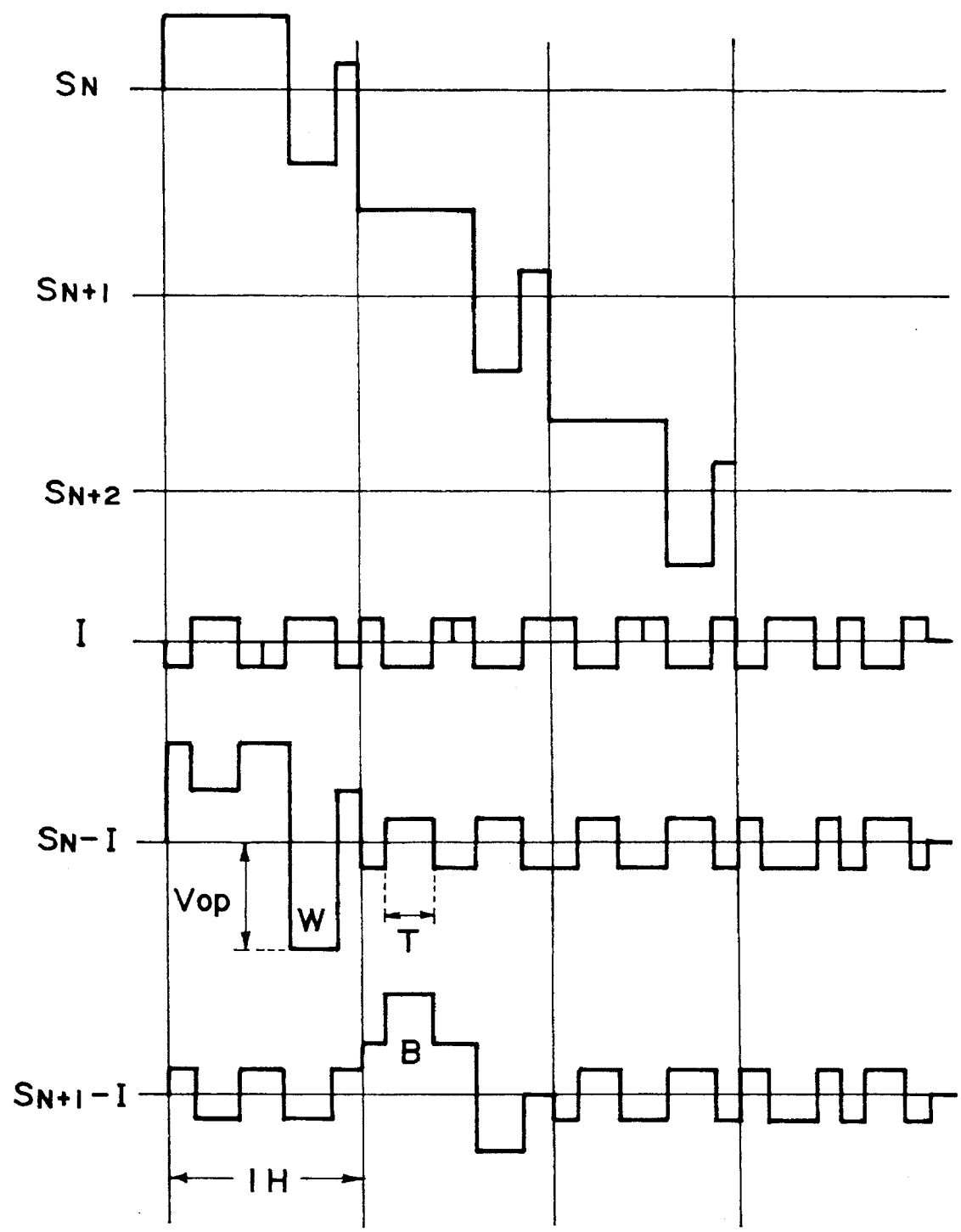
FIG. 7 is a time chart showing a set of drive voltage waveform for measuring a drive margin.

In an actual operation of a liquid crystal device using a chiral smectic liquid crystal as a display panel, an electric field is applied between a pair of substrates via scanning electrodes and data electrodes disposed on the substrates, respectively, in the form of a matrix. For example, FIG. 7 is a waveform diagram showing a set of drive waveforms for effecting image display on the display panel wherein at $S_N$ and $S_{N+1}$ are shown voltage waveforms applied to scanning electrodes $S_N$ and $S_{N+1}$, and at I is shown a voltage waveform applied to a data electrode I, whereby voltages as shown at $S_N$–I and $S_{N+1}$–I are applied to pixels at the intersections of the scanning electrodes and the data electrode.

Hereinbelow, the present invention will be described more specifically based on Examples. In such Examples, liquid crystal compositions were evaluated by incorporating them in liquid crystal devices having a structure similar to that described with reference to FIG. 4 and prepared in a process similar to the one described above.

The parameters, such as response speed, cone angle Ⓗ, apparent tilt angle θa, liquid crystal layer inclination angle θ, pretilt angle α, and smectic layer spacing d discussed herein, are based on values measured according to the following methods.

Response speed (Response time τ)

A sample device sandwiched between right-angle cross-nicol polarizers was supplied with rectangular pulse waves of ±10.0 volts and 5.0 Hz, and a time required for causing a light quantity change of 0 to 90 % was measured as a response time τ representing a response speed while observing the optical response through a photomultiplier (available from Hamamatsu Photonics K.K.).

Cone angle Ⓗ

A sample liquid crystal device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A cone angle Ⓗ was measured as a half of the angle between the first and second extinct positions.

Apparent tilt angle θa

A sample device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the device was supplied with a single pulse of the opposite polarity exceeding the threshold voltage of the liquid crystal and was then rotated under no electric field relative to the polarizers to find a second extinct position. An apparent tilt angle θa was measured as a half of the angle between the first and second extinct positions.

Liquid crystal layer inclination angle δ and layer spacing d

The methods used were basically similar to the method used by Clark and Lagerwall (Japan Display '86, Sep. 30–Oct. 2, 1986, p.p. 456–458) or the method of Ohuchi et al (J.J.A.P., 27 (5) (1988), p.p. 725–728). The measurement was performed by using a diffraction apparatus (available from MAC Science having a rotary cathode-type X-ray generating unit as shown in FIG. 8), and 80 μm-thick glass sheets ("Microsheets", available from Corning Glass Works) were used as substrates so as to minimize the heat capacity and the X-ray absorption with the glass substrates.

Figure 8:
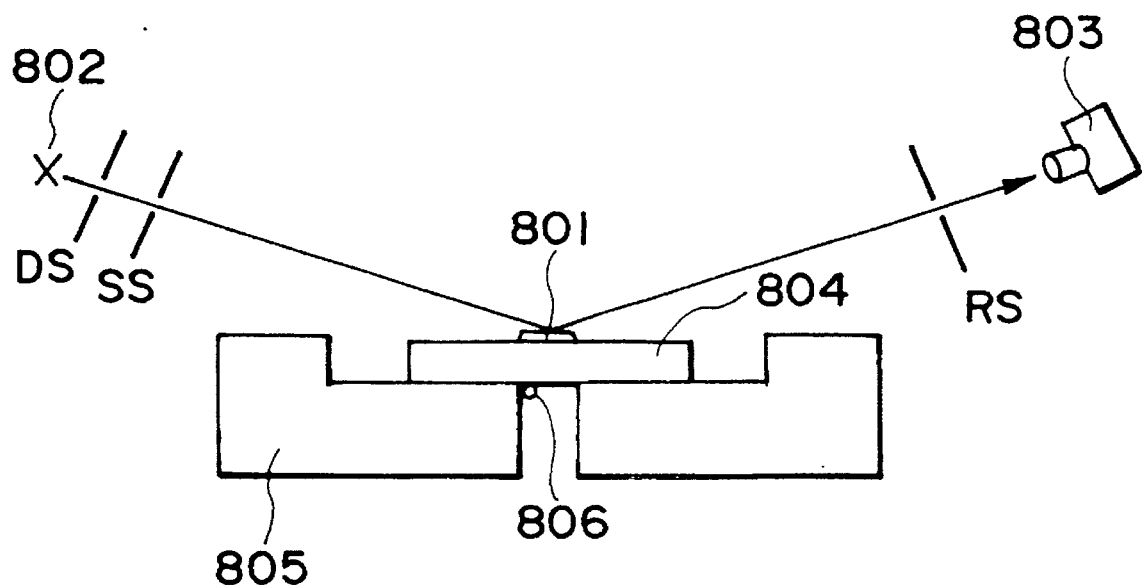
FIG. 8 is an illustration of an instrument system including an X-ray diffraction system and an automatic temperature controller for measuring a layer spacing d in smectic phase of a liquid crystal composition.
Figure 9:
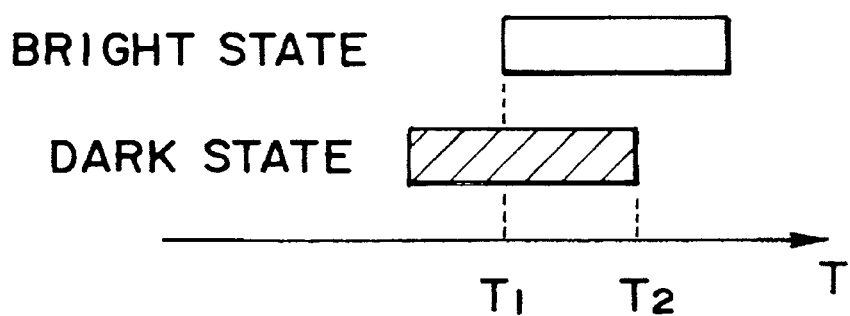
FIG. 9 is an illustration of a drive margin.

More specifically, for measurement of the layer spacing d, a system as shown in FIG. 8 was used, wherein a sample liquid crystal composition 801 was applied in a 5 mm-square size so as to form a flat surface on the 80 μm-thick glass sheet and, while being temperature-controlled by a temperature-controlling plate 805 and a temperature-monitoring thermocouple 806, irradiated with X rays from a rotary X-ray source 802, so that the output light including diffraction rays was detected by a detector (counter) 803, similarly as in the ordinary powder X-ray diffraction. An angle providing a peak of X-ray intensity was substituted in the Bragg's formula for diffraction condition to obtain a layer spacing d.

Each sample liquid crystal composition was first brought to its isotropic phase temperature, and the measurement was repeated every 5° C. or every 1° C. in the vicinity of a transition point while cooling the sample down to a temperature where no diffraction peak was observed. The automatic temperature controller including the plate 805 and the monitoring thermocouple 804 allowed a control accuracy of ±0.3° C. at each measurement temperature.

The measurement was performed by using CuKα-rays (1.54050 Å) at a power of 45 kV-100 mA as analyzing rays and using a slit system including DS of 0.05 mm, SS of 0.05 mm and RS of 0.05 mm. The scanning was performed at a rate of 3 deg./min.

For the measurement of smectic layer inclination angle δ, a sample cell having a cell gap of 80 μm was prepared by using a pair of the 80 μm-thick glass sheets while using the same glass sheet as a spacer. A sample liquid crystal composition filling the sample cell was heated to isotropic phase and then gradually cooled to be homogeneously aligned under application of a magnetic field in a direction parallel to the substrates by an electromagnet. Then, the X-ray detector was set at the angle 2θ giving the above-mentioned layer spacing d, and the sample cell was subjected to θ-scanning. From the measured values, δ was calculated according to the method described in the above-mentioned references.

According to the above-described method, it is possible to obtain a layer inclination angle δ intrinsic to a sample liquid crystal composition while substantially removing the effect of a cell thickness thereon. However, it is also possible to obtain a substantially identical δ value in the temperature range of ca. 20° C. to 60° C. by using a 1.2 μm-thick cell having rubbed alignment films of polyimides (like those obtained from "LP-64", "SP-710" or "SP-510" described above) instead of such an 80 μm-thick cell subjected to a magnetic field aligning treatment.

Pretilt angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

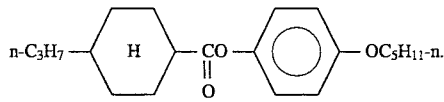

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

Then, the transmitted light intensity spectrum obtained by interference was fitted by simulation to the following theoretical formulae (12) and (13), thereby obtaining a pretilt angle α.

$$T(\phi) = \cos^2\left[\frac{\pi d}{\lambda}\left(\frac{No\,Ne\sqrt{N^2(\alpha)-\sin^2\phi}}{N^2(\alpha)} - \sqrt{No^2-\sin^2\phi} - \frac{Ne^2-No^2}{N^2(\alpha)}\sin\alpha\cos\alpha\sin\phi\right)\right] \quad (12)$$

$$N(\alpha) \equiv \sqrt{No^2\cos^2\alpha + Ne^2\sin^2\alpha} \quad (13)$$

In the above formula, the symbols represent the following parameters:

No: refractive index of ordinary ray,

Ne: refractive index of extraordinary ray,

Φ: rotation angle of the sample cell,

T(Φ): transmitted light intensity, d: cell thickness,

λ: wavelength of incident light

Contrast C/R

A sample liquid crystal device disposed between right-angle cross-nicol polarizers was supplied with a single pulse of one polarity to uniformly form one stable state and then rotated relative to the polarizers to find a first extinction position. The liquid crystal device fixed at the position was then supplied with a single pulse of the opposite polarity to form another stable state giving a bright state at the observed position. The output voltage from a photomultiplier in this state is divided by the output voltage in the extinction position to provide a contrast.

Drive margin M

Electrodes on a pair of substrates of a sample liquid crystal device disposed between a pair of right-angle cross-nicol polarizers were supplied with a combination of a scanning signal, e.g., as shown at $S_N$ and a data signal, e.g., as shown at I in FIG. 7 so as to write a dark state and a bright state, respectively while varying a pulse duration T at a fixed peak value Vop allowable ranges of T for stably providing a dark state and a bright state were measured. In case where the ranges for T are determined as shown in FIG. 8, for example, a drive margin M is given by the following formula (14):

$$M = [\tfrac{1}{2}\cdot(T_2-T_1)]/[\tfrac{1}{2}\cdot(T_2+T_1)] \quad (14),$$

wherein $T_1$ is a minimum width for stably writing a bright state and $T_2$ is a maximum width for stably writing a dark state. The drive margin M has a larger value if a larger overlapping of the ranges $T_1$ and $T_2$ for writing dark and bright states is obtained.

Phase transition temperature

The phase transition temperatures of each liquid crystal composition were measured by a DSC (differential scanning calorimeter) in combination with an observation of a cell containing the liquid crystal composition through a polarizing microscope.

EXAMPLES 1–20

Figure 10:
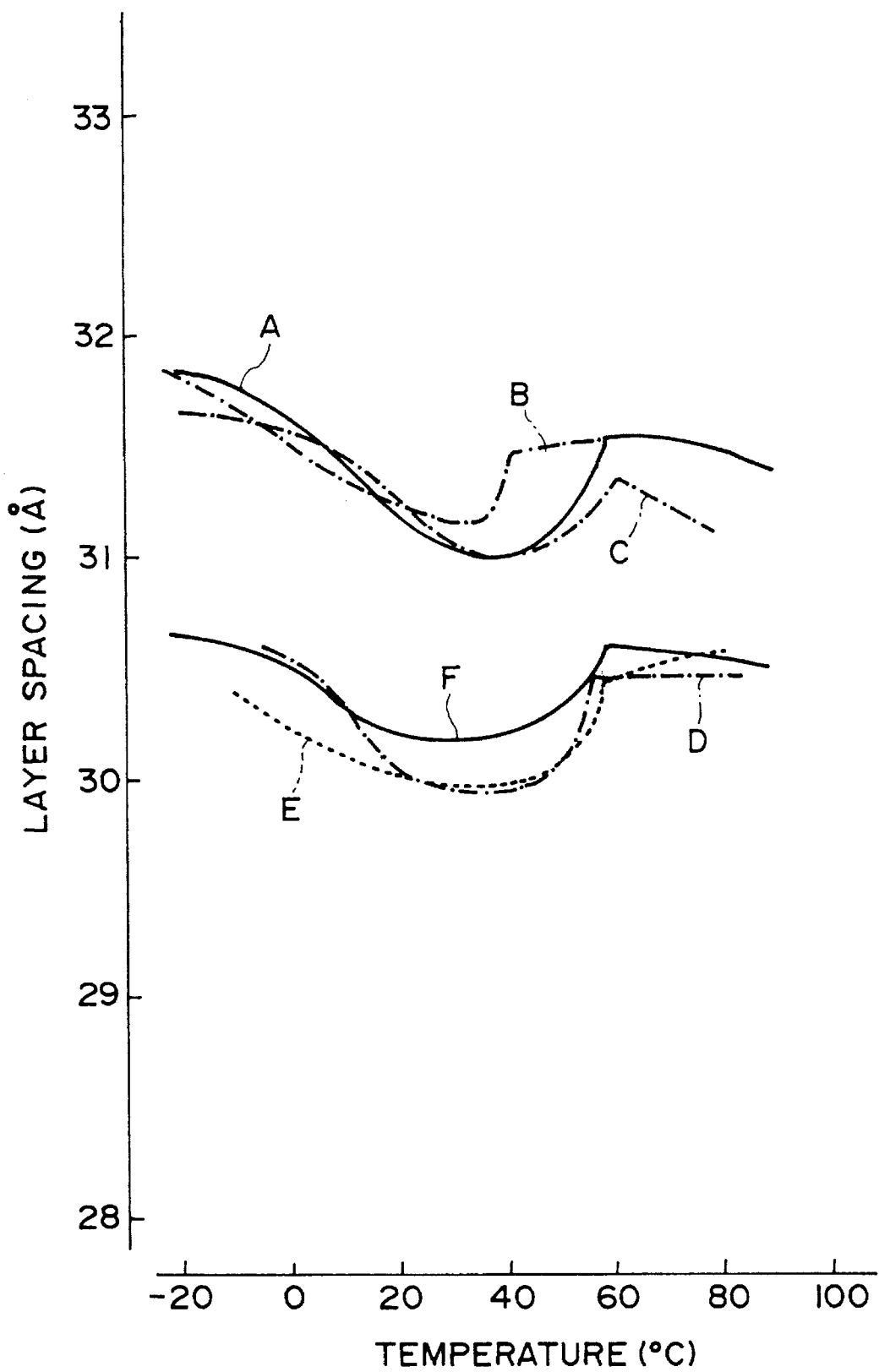
Figure 11:
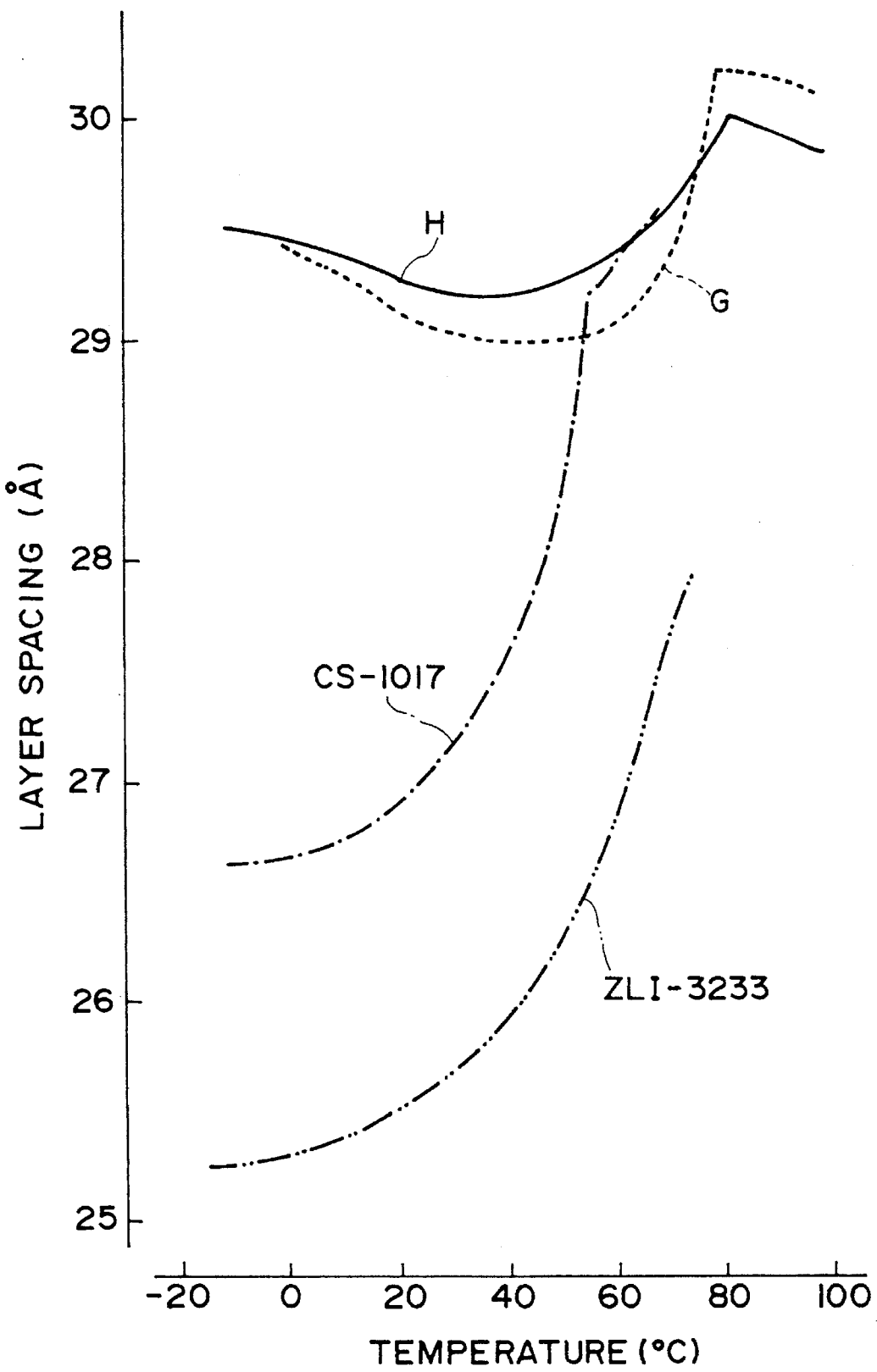
Figure 13:
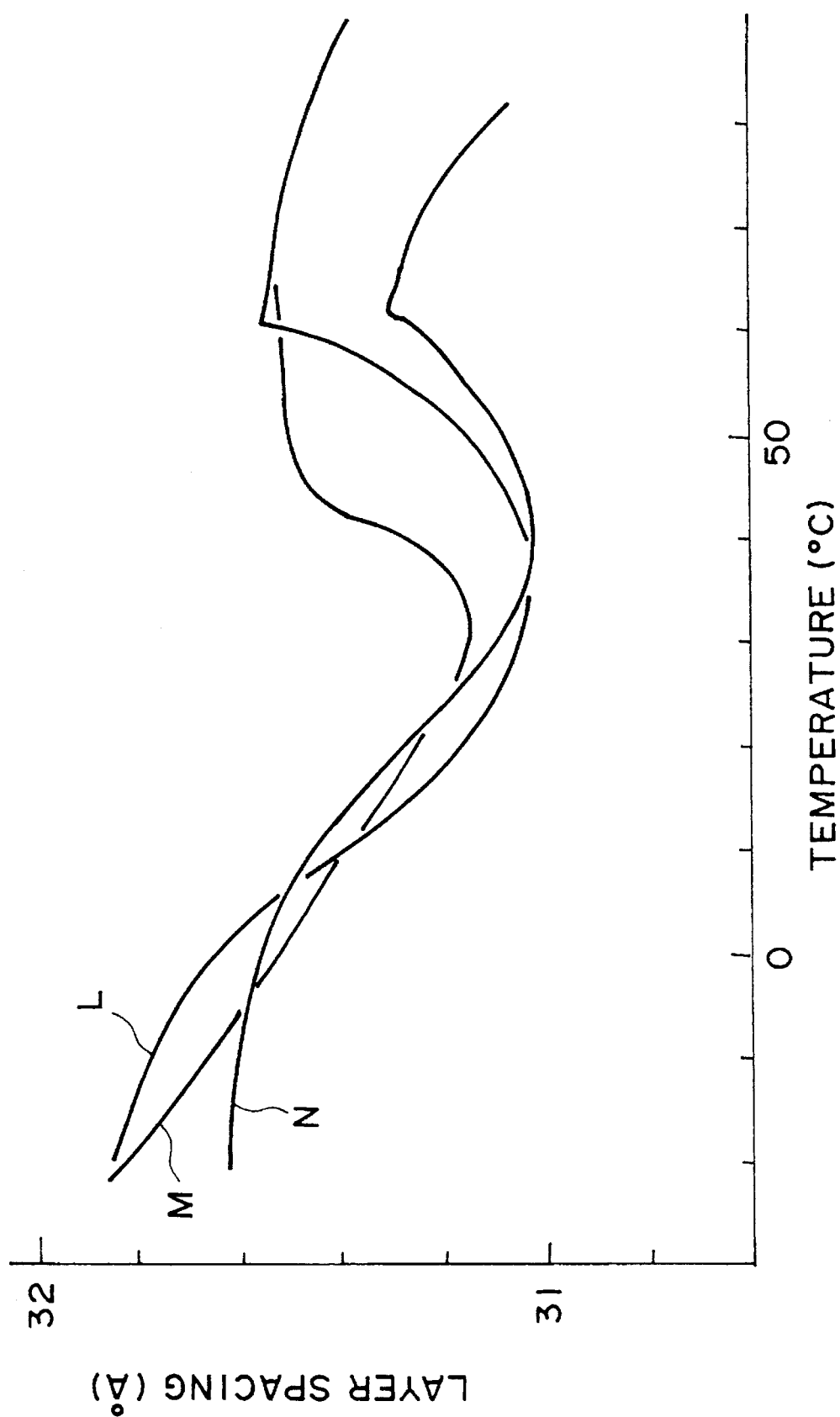
Figure 14:
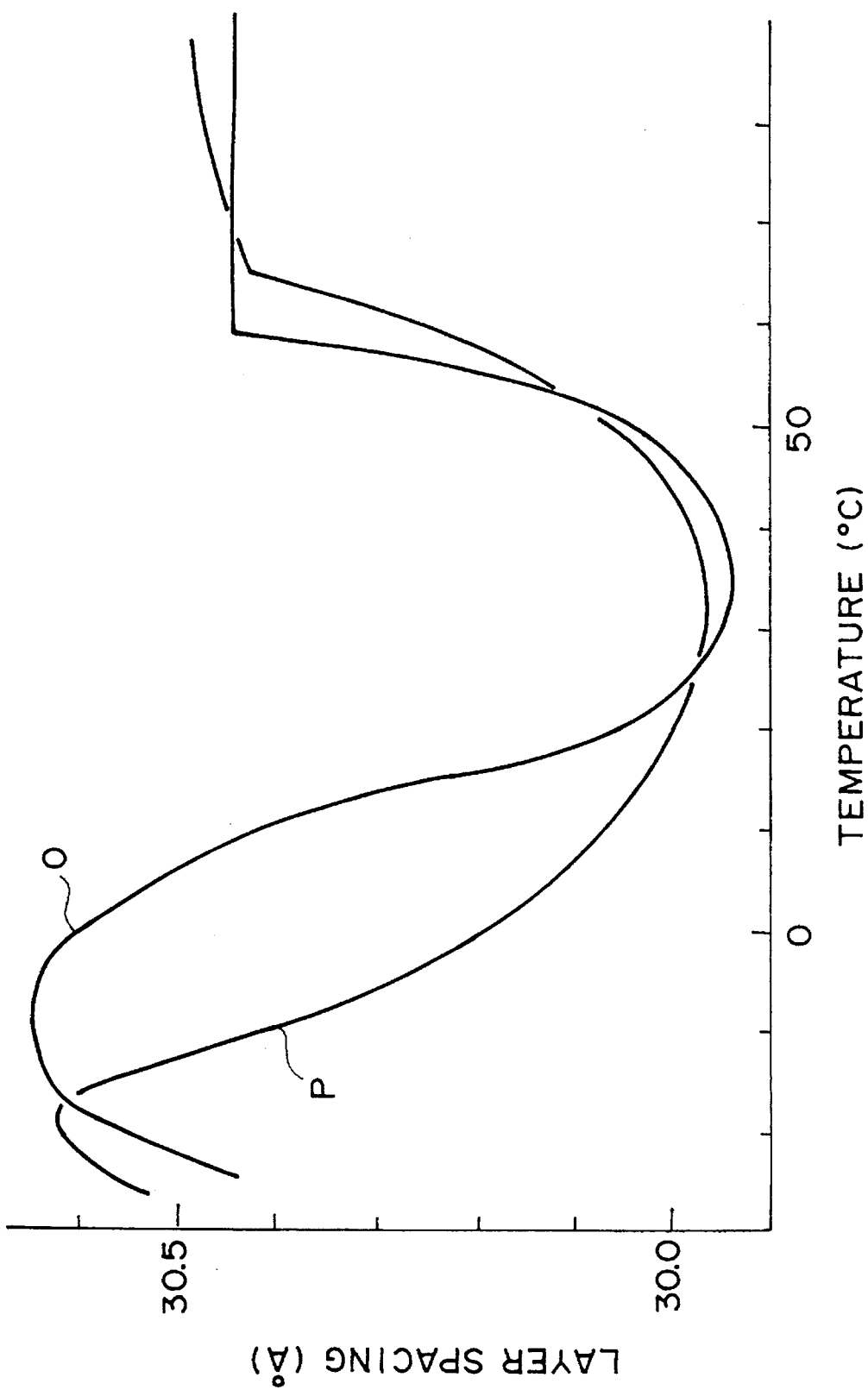
Figure 15:
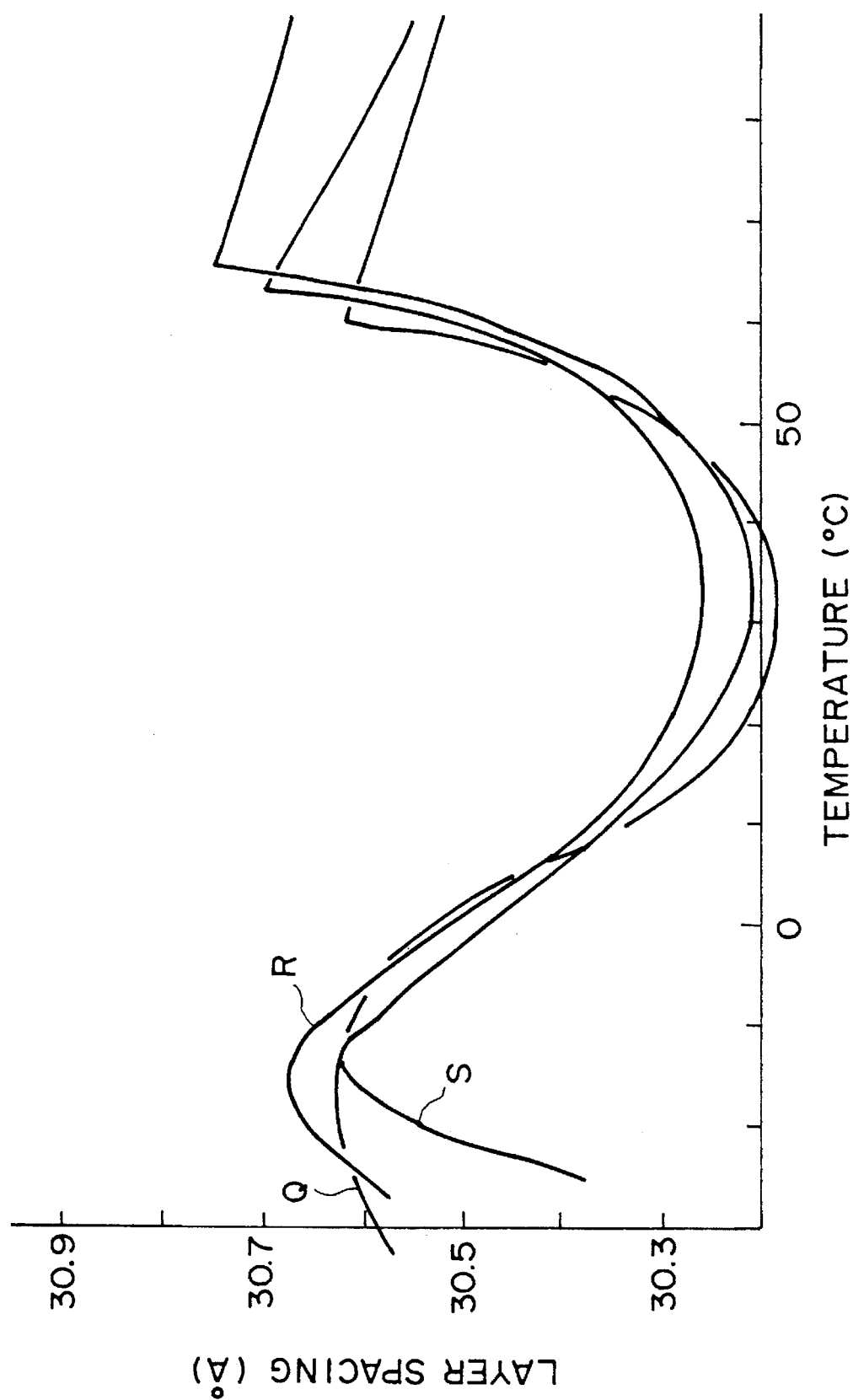
Figure 16:
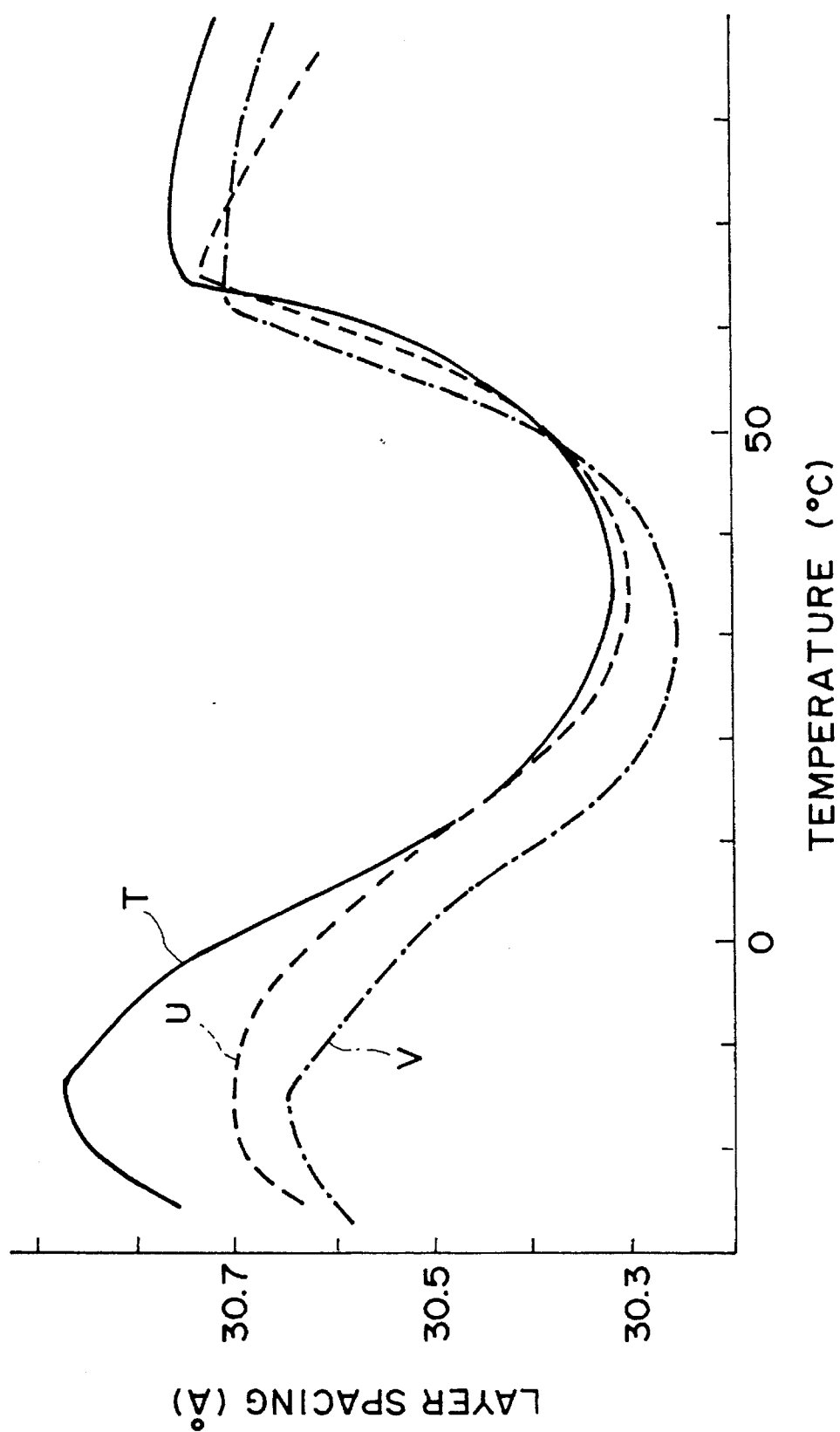

Table 4 below shows phase transition temperatures (°C., on temperature decrease), SmA phase temperature range width (°C.) and types of temperature-dependent layer spacing d-changing characteristic for liquid crystal compositions A–K and other commercially available compositions ("CS-1017", available from Chisso K.K.; and "ZLI-3233" available from Merck Co.) used in Examples 1–20 appearing hereinafter. The temperature-dependent layer spacing-changing characteristics are also shown in FIGS. 10–12.

The temperature-dependent layer spacing d-changing characteristics shown in Table 4 are characterized by types I–V according to the following standards:

I: In SmC* phase, the layer spacing d decreases and then increases on temperature decrease, thus having a minimum value $d_{min}$.

II: In SmC* phase, the layer spacing d decreases on temperature decrease and has no minimum value $d_{min}$.

III: In SmA phase, the layer spacing d increases on temperature decrease.

IV: In SmA phase, the layer spacing d is constant.

V: In SmA phase, the layer spacing d decreases on temperature decrease.

TABLE 4

| | Phase transition temperature Cry→, Sm° C.←, SmA←, Ch←, Iso | | | | Type of $d$ change | SmA range (°C.) |
|---|---|---|---|---|---|---|
| CS-1017 | −10 | 55 | 66 | 72 | II, V | 11 |
| ZLI-3233 | −15 | 72 | 78 | 90 | II, V | 6 |
| A | −8.6 | 65.5 | 88.9 | 95.6 | I, II | 23.4 |
| B | −12.6 | 55.2 | 72.6 | 77.9 | I, V | 17.4 |
| C | −14.5 | 62.7 | 87.0 | 92.8 | I, III | 24.3 |
| D | −8.6 | 66.9 | 89.1 | 96.2 | I, IV | 22.2 |
| E | −9.3 | 70.4 | 88.6 | 98.9 | I, V | 18.2 |
| F | −8.5 | 67.6 | 91.5 | 100.0 | I, III | 23.9 |
| G | −0.3 | 79.5 | 108.3 | 132.3 | I, III | 28.8 |
| H | −5.0 | 82.9 | 114.0 | 136.5 | I, III | 31.1 |
| I | −20.6 | 64.6 | 90.6 | 98.8 | I, III | 26.0 |
| J | −18.9 | 64.6 | 89.8 | 98.2 | I, III | 25.2 |
| K | −17.0 | 66.3 | 90.5 | 98.8 | I, III | 24.2 |

The liquid crystal compositions A–H shown in Table 4 are all compositions comprising a phenylpyrimidine-type mesomorphic compound as a principal component.

The liquid crystal compositions I, J and K include the component compounds identified by their structural formulae shown below in the respectively indicated proportions:

| Component | wt. % |
|---|---|
| [Composition I] | |

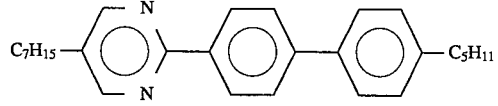
7

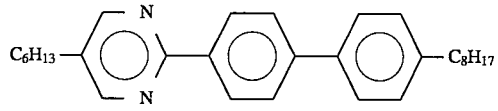
11

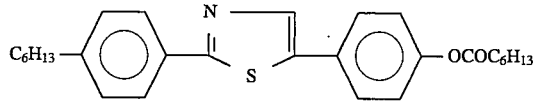
8

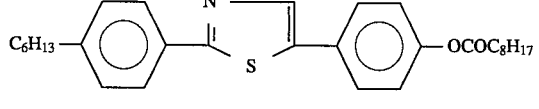
2

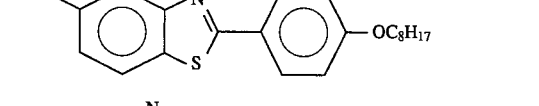
4

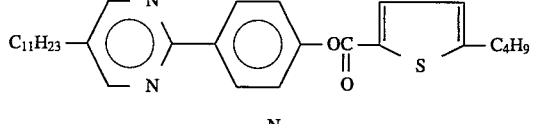
9

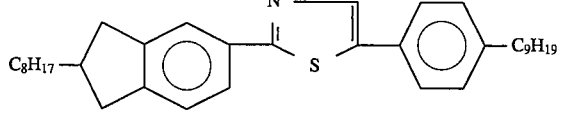
6

-continued
| Component | wt. % |
|---|---|
| 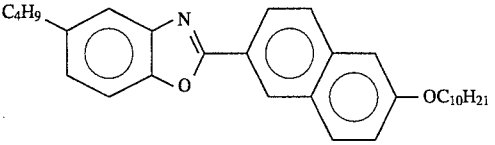 | 5 |
| 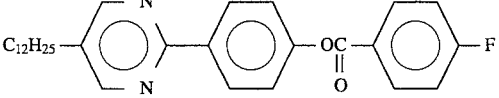 | 5 |
| 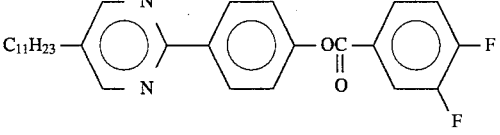 | 2 |
| 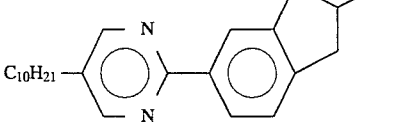 | 10 |
| 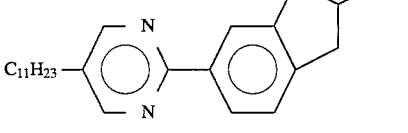 | 7 |
| 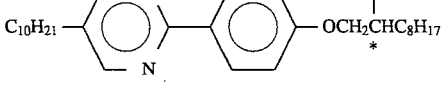 | 10 |
| 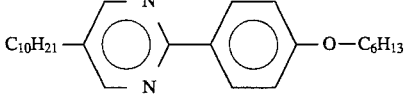 | 4 |
| 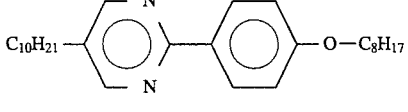 | 5 |
| 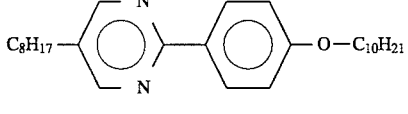 | 5 |
[Composition J]
| | |
|---|---|
| 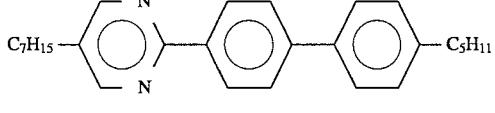 | 7 |
| 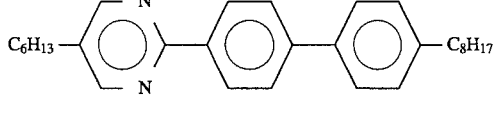 | 11 |
| 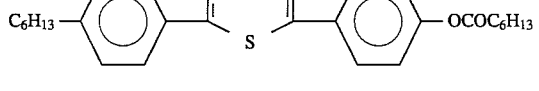 | 2 |

-continued

| Component | wt. % |
|---|---|
| C$_6$H$_13$—⟨phenyl⟩—C(=N)—S—⟨thiophene⟩—⟨phenyl⟩—OCOC$_8$H$_17$ | 2 |
| C$_6$H$_13$—⟨benzothiazole⟩—⟨phenyl⟩—OC$_8$H$_17$ | 4 |
| C$_11$H$_23$—⟨pyrimidine⟩—⟨phenyl⟩—OC(=O)—⟨thiophene⟩—C$_4$H$_9$ | 9 |
| C$_8$H$_17$—⟨indane⟩—C(=N)—S—CH=⟨phenyl⟩—C$_9$H$_19$ | 6 |
| C$_4$H$_9$—⟨benzoxazole⟩—⟨naphthalene⟩—OC$_10$H$_21$ | 5 |
| C$_12$H$_25$—⟨pyrimidine⟩—⟨phenyl⟩—OC(=O)—⟨phenyl⟩—F | 5 |
| C$_11$H$_23$—⟨pyrimidine⟩—⟨phenyl⟩—OC(=O)—⟨phenyl⟩(F)(F) | 2 |
| C$_10$H$_21$—⟨pyrimidine⟩—⟨indane-C$_8$H$_17$⟩ | 10 |
| C$_11$H$_23$—⟨pyrimidine⟩—⟨indane-C$_8$H$_17$⟩ | 7 |
| C$_10$H$_21$—⟨pyrimidine⟩—⟨phenyl⟩—OCH$_2$CH(F)C$_8$H$_17$ (*) | 10 |
| C$_10$H$_21$—⟨pyrimidine⟩—⟨phenyl⟩—O—C$_6$H$_13$ | 4 |
| C$_10$H$_21$—⟨pyrimidine⟩—⟨phenyl⟩—O—C$_6$H$_17$ | 5 |

| Component | wt. % |
|---|---|
| 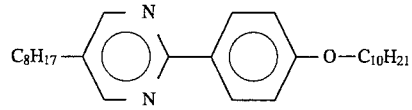 | 5 |
| 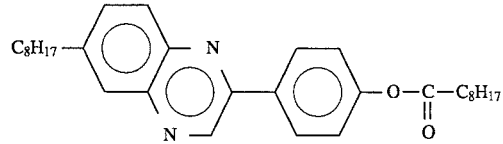 | 6 |
[Composition K]
| Component | wt. % |
|---|---|
|  | 7 |
|  | 11 |
| 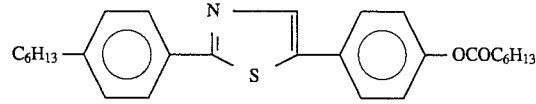 | 4 |
| 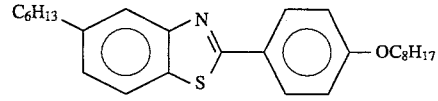 | 4 |
| 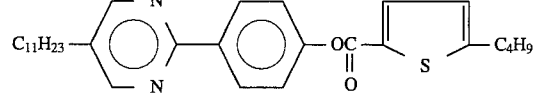 | 9 |
| 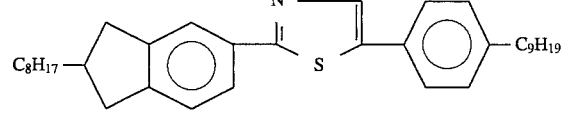 | 6 |
| 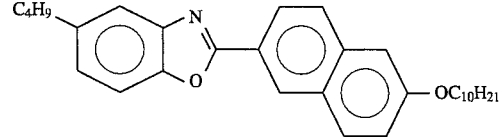 | 5 |
| 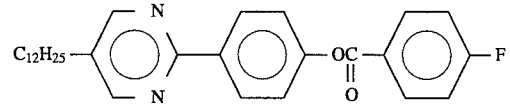 | 5 |
| 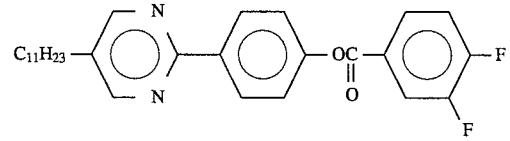 | 2 |

| Component | wt. % |
|---|---|
| 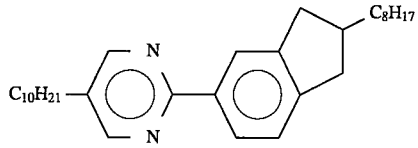 | 10 |
| 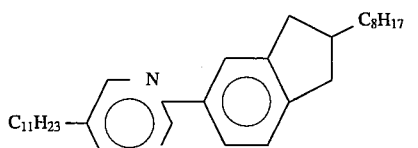 | 7 |
| 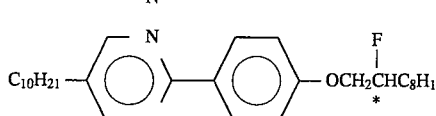 | 10 |
| 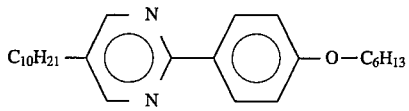 | 4 |
| 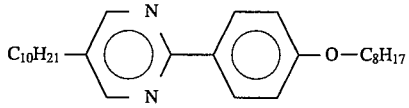 | 5 |
| 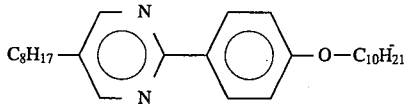 | 5 |
| 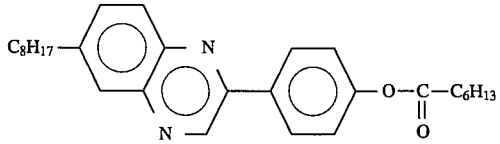 | 2 |
| 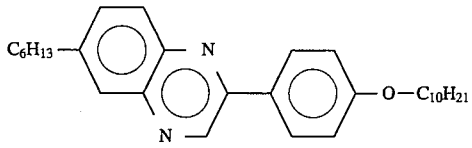 | 4 |

EXAMPLES 1–5

The temperature-dependence of response speed (response time) was evaluated with respects to liquid crystal compositions showing a minimum (second transition point) of layer spacing and liquid crystal compositions having no minimum. The results are shown in Table 5 below.

Each device was prepared by using "LQ-1802" for alignment control films so as to provide a pretilt angle of ca. 17 deg., a rubbing intersection angle of 8 deg., and a cell gap of 1.2 μm.

TABLE 5

| Example | Composition | Type of d change | 30° C. (°) Ⓗ | δ | θa | Response time (μsec) 10° C. | 50° C. | f$^{10/50}$ |
|---|---|---|---|---|---|---|---|---|
| 1 | A | I, III | 14.7 | 10.5 | 11.9 | 114 | 31 | 3.68 |
| 2 | D | I, IV | 14.8 | 10.5 | 11.7 | 109 | 34 | 3.21 |
| 3 | F | I, III | 15.0 | 10.2 | 11.8 | 174 | 41 | 4.24 |
| 4 | CS 1017 | II, V | 25.7 | 22.6 | 13.8 | 825 | 55 | 15.0 |
| 5 | ZLI 3233 | II, V | 30.0 | 27.0 | 15.1 | 2560 | 147 | 17.4 |

From the above results, the liquid crystal compositions CS-1017 and ZLI-3233 having no minimum (second transition point) of layer spacing in SmC* phase showed temperature characteristic factor $f^{10/50}$ regarding response speed (a ratio of response time between 10° C. and 50° C.) which were 15 or larger in an expected environmental temperature range of 10°–50° C. for a liquid crystal display device. On the other hand, the liquid crystal compositions A, D and F having a minimum (second transition point) of layer spacing in SmC* phase showed temperature characteristic factors $f^{10/50}$ on the order of 3–4 indicating an improved temperature-dependence of response speed.

EXAMPLES 6–11

Some liquid crystal compositions all having a minimum (second transition point) of liquid crystal in SmC* phase including some compositions (A, C, D and F) of which the layer spacing increased or was constant on temperature decrease in SmA phase and other compositions (B and E) of which the layer spacing decreased on temperature decrease in SmA phase, were examined with respect to a contrast change before and after a temperature increase spanning the phase transition temperature of SmC* phase to SmA phase. The results are shown in Table 6.

More specifically, each liquid crystal device was prepared by using "LQ-1802" for alignment control films so as to provide a pretilt angle of ca. 19 degrees, a rubbing intersection angle of 6 degrees, and a cell gap of 1.1 µm.

Each liquid crystal device prepared was heated from room temperature at a rate of 1° C./min. up to a temperature which was 5° C. above the SmC*→SmA transition temperature and retained for 10 hours at that temperature, followed by cooling to room temperature at a rate of 1° C./min. The contrast of each device was measured at 30° C. respectively before and after the heating.

TABLE 6

| Example | Composition | Type of d change | 30° C. (°) | | | Contrast | |
|---|---|---|---|---|---|---|---|
| | | | Ⓗ | δ | θa | Before heating | After heating |
| 6 | A | I, III | 14.7 | 10.5 | 11.9 | 96:1 | 94:1 |
| 7 | C | I, III | 14.7 | 7.7 | 10.0 | 76:1 | 73:1 |
| 8 | D | I, IV | 14.8 | 10.2 | 11.7 | 92:1 | 92:1 |
| 9 | F | I, III | 15.0 | 10.2 | 11.8 | 106:1 | 102:1 |
| 10 | B | I, V | 14.1 | 9.8 | 11.2 | 90:1 | 56:1 |
| 11 | E | I, V | 14.6 | 10.1 | 11.6 | 88:1 | 30:1 |

From the above results, it is understood that the liquid crystal compositions A, C, D and F having a minimum (second transition point) of layer spacing in SmC* and also a layer spacing increasing or being constant in SmA phase, showed much less contrast change before and after heating over the SmC*→SmA phase transition temperature, compared with the liquid crystal compositions B and E having a layer spacing which decreased on temperature decrease in SmA phase. Thus, such compositions A, C, D and F caused little change in alignment state even under heating over the phase transition temperature and were estimated to show stable characteristics, particularly stable display characteristics, even after a storage at higher temperatures.

EXAMPLES 12–17

Among liquid crystal compositions having a minimum $d_{min}$ (second transition point) of layer spacing in SmC* phase, compositions satisfying and not satisfying the following formula (8) between $d_{min}$ and $d_A$ (layer spacing at a first transition point in the vicinity of the SmA→SmC* phase transition temperature) were evaluated with respect to drive margin:

$$0.975 < d_{min}/d_A < 0.990 \qquad (8).$$

The results are shown in Table 7.

Each device was prepared by using "LQ-1802" for alignment control films so as to provide a pretilt angle of ca. 16 degrees, a rubbing intersection angle of 8 degrees, and a cell gap of 1.2 µm. The drive margin was measured while setting the writing peak voltage Vop at 15 volts (in the waveform shown in FIG. 7).

TABLE 7

| Example | Composition | $d_{min}/d_A$ | 30° C. (°) | | | Drive margin M | | |
|---|---|---|---|---|---|---|---|---|
| | | | Ⓗ | δ | θa | 10° C. | 30° C. | 50° C. |
| 12 | A | 0.983 | 14.7 | 10.5 | 11.9 | 0.17 | 0.27 | 0.35 |
| 13 | D | 0.983 | 14.8 | 10.5 | 11.7 | 0.14 | 0.27 | 0.33 |
| 14 | F | 0.986 | 15.0 | 10.2 | 11.8 | 0,25 | 0.33 | 0.35 |
| 15 | C | 0.991 | 11.6 | 6.6 | 8.3 | — | 0.05 | 0.30 |
| 16 | G | 0.960 | 19.8 | 16.0 | 17.3 | 0.02 | — | — |
| 17 | H | 0.973 | 15.6 | 11.5 | 12.9 | — | 0.01 | 0.17 |

From the above results, among the liquid crystal compositions having a minimum $d_{min}$ of layer spacing in SmC* phase, those compositions A, D and F satisfying the formula (8) provided a sufficient drive margin over an expected operational environmental temperature range of 10°–50° C. for a liquid crystal display device, but the compositions C, G and H not satisfying the formula (8) resulted in a drive margin over a narrower temperature range and the resultant drive margin values were rather small.

EXAMPLES 18–20

The temperature-dependence of response speed was evaluated with respect to liquid crystal compositions containing an indan compound or/and quinoxaline compound. The results are shown in Tables 8-1 and 8-2 below.

Each device was prepared by using "LQ-1802" for alignment control films so as to provide a pretilt angle of ca. 18 degrees, a rubbing intersection angle of 8 degrees, and a cell gap of 1.2 µm.

TABLE 8-1

| Example | Composition | Type of d change | 30° C. (°) Ⓗ | δ | θa | Response time (μsec) 10° C. | 50° C. | $f^{10/50}$ |
|---|---|---|---|---|---|---|---|---|
| 18 | I | I, III | 14.2 | 9.8 | 11.0 | 279 | 51 | 5.47 |
| 19 | J | III | 14.7 | 10.4 | 11.6 | 193 | 58 | 3.33 |
| 20 | K | III | 14.5 | 10.2 | 11.5 | 178 | 53 | 3.36 |

TABLE 8-2

| Example | Composition | Compound Indan-type | Quinoxaline-type |
|---|---|---|---|
| 18 | I | 23% | 0% |
| 19 | J | 23% | 6% |
| 20 | K | 23% | 6% |

Compared with the compositions of Examples 4 and 5 shown in Table 1, the composition I of Example 18 showing Type I of temperature-dependent layer spacing-changing characteristic in SmC* phase, showed a much smaller temperature-dependence of response speed.

Further, the composition J and K containing both indan compound and quinoxaline compound also showed Type I of temperature-dependence layer spacing-changing characteristic and further smaller temperature-dependence of response speed. This tendency was also confirmed with respect to other compositions containing both indan compound and quinoxaline compound, which were thus regarded to be suitable as liquid crystal compositions showing the characteristics required by the present invention.

EXAMPLES 21–44

Table 9 below shows phase transition temperatures (generally, on temperature decrease) and Table 10 below shows types of temperature-dependent layer spacing d-changing characteristics in smectic phase and characteristic ratios $d_{min}/d_A$, $d_{max}/d_A$ and $d_c/d_A$ (wherein $d_A$: layer spacing at the first transition point, $d_{max}$: layer spacing at the third transition point; $d_{min}$: layer spacing at the second transition point; and $d_c$: a minimum value of layer spacing below the third transition point in SmC* phase down to another lower-temperature), respectively, of liquid crystal compositions L–V and commercially available composition "CS-1017" and "ZLI-3233". The temperature-dependent layer spacing d-characteristics are also shown in FIGS. 13–16.

None of the liquid crystal compositions L–V caused crystallization even at –25° C. when they were contained in a liquid crystal device.

The temperature-dependent layer spacing d-changing characteristics shown in Table 10 are characterize by types VI–IX according to the following standards:

VI: The layer spacing d in smectic phase almost monotonously decreases on temperature decrease regardless of whether or not it shows a first transition point where the layer spacing d abruptly decreases (in other words, an ordinary temperature-dependent layer spacing-changing characteristic).

VII: The layer spacing d assumes a first transition point in the neighborhood of SmA→SmC* phase transition temperature on temperature decrease and further assumes a minimum $d_{min}$ at a second transition point at which the layer spacing d turns to increase on further temperature decrease.

VIII: On temperature decrease, the layer spacing d assumes the first and second transition points, and also a third transition point where the layer spacing d turns to decrease on further temperature decrease, and further satisfies the following formula (10) between $d_c$ and $d_A$:

$$d_c/d_A \leq 1.003 \qquad (10).$$

IX: The layer spacing-changing characteristic satisfies the above conditions VIII and also satisfies the following formula (11):

$$0.993 \leq d_{max}/d_A \leq 1.003 \qquad (11).$$

TABLE 9

| Composition | Phase transition temperature (°C.) Cry → SmC* ← SmA ← Ch ← Iso | | | |
|---|---|---|---|---|
| CS-1017 | –10 | 55 | 66 | 72 |
| ZLI-3233 | –15 | 72 | 78 | 90 |
| L | –8.6 | 61.3 | 88.9 | 95.6 |
| M | –12.6 | 51.8 | 72.6 | 77.9 |
| N | –8.9 | 64.1 | 88.4 | 95.6 |
| O | –8.6 | 64.1 | 89.1 | 96.2 |
| P | –9.3 | 67.1 | 88.6 | 98.9 |
| Q | –8.5 | 63.1 | 91.5 | 100.0 |
| R | –6.9 | 64.9 | 82.3 | 99.8 |
| S | –7.2 | 68.1 | 91.6 | 99.3 |
| T | –12.1 | 65.2 | 90.4 | 98.0 |
| U | –12.6 | 65.1 | 88.0 | 96.5 |
| V | –10.7 | 62.1 | 89.0 | 97.7 |

TABLE 10

| Composition | Type of d change | $d_c/d_A$ | $d_{max}/d_A$ | $d_{min}/d_A$ |
|---|---|---|---|---|
| CS-1017 | VI | — | — | — |
| ZLI-3233 | VI | — | — | — |
| L | VII | — | — | 0.994 |
| M | VII | — | — | 0.989 |
| N | VII | — | — | 0.991 |
| O | VIII | 1.000 | 1.006 | 0.983 |
| P | VIII | 1.003 | 1.006 | 0.985 |
| Q | IX | 0.998 | 1.000 | 0.986 |
| R | IX | 0.996 | 0.999 | 0.986 |
| S | IX | 0.988 | 0.996 | 0.982 |
| T | VIII | 1.000 | 1.004 | 0.986 |
| U | IX | 0.997 | 0.999 | 0.986 |
| V | IX | 0.996 | 0.998 | 0.985 |

The liquid crystal compositions L, N, P, Q, R and S in Tables 9 and 10 are all compositions comprising a phenylpyrimidine-type mesomorphic compound as a principal component.

The liquid crystal compositions M, O, T, U and V have the following compositions.

| Component | wt. % |
|---|---|
| [Composition M] | |
| C₅H₁₁–⟨phenyl⟩–C(=N–N)–S–⟨thiadiazole⟩–⟨phenyl⟩–C₅H₁₁ | 5 |
| C₆H₁₃–⟨phenyl⟩–C(=N–N)–S–⟨thiadiazole⟩–⟨phenyl⟩–C₆H₁₃ | 5 |
| C₄H₉–⟨thiophene⟩–CO–O–⟨phenyl⟩–⟨pyrimidine-N,N⟩–C₁₁H₂₃ | 6.7 |
| C₄H₉–⟨thiophene⟩–CO–O–⟨phenyl(F)⟩–⟨pyrimidine-N,N⟩–C₁₁H₂₃ | 3.3 |
| C₆H₁₃–⟨benzothiazole⟩–⟨phenyl⟩–OC₈H₁₇ | 20 |
| C₁₀H₂₁O–⟨phenyl⟩–CO–O–⟨phenyl⟩–OCH₂CH(CH₃)C₂H₅ | 26 |
| C₁₀H₂₁–⟨pyrimidine⟩–⟨phenyl⟩–OCH₂CH(F)C₆H₁₃ * | 10 |
| C₆H₁₃–⟨pyrimidine⟩–⟨phenyl⟩–OC₁₂H₂₅ | 4 |
| C₈H₁₇–⟨pyrimidine⟩–⟨phenyl⟩–OC₉H₁₉ | 8 |
| C₈H₁₇–⟨pyrimidine⟩–⟨phenyl⟩–OC₁₀H₂₁ | 8 |
| C₉H₁₉–⟨pyrimidine⟩–⟨phenyl⟩–OC₈H₁₇ | 4 |
| [Composition O] | |
| C₈H₁₇–⟨pyrimidine⟩–⟨phenyl⟩–OC₁₀H₂₁ | 8 |

-continued

| Component | wt. % |
|---|---|
| 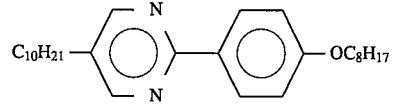 C₁₀H₂₁–[pyrimidine]–[phenyl]–OC₈H₁₇ | 9 |
| C₉H₁₉–[pyrimidine]–[phenyl]–OC₆H₁₃ | 6 |
| C₆H₁₃–[pyrimidine]–[phenyl]–OC₁₀H₂₁ | 6 |
| C₇H₁₅–[pyrimidine]–[phenyl]–OC₉H₁₉ | 2 |
| C₈H₁₇–[pyrimidine]–[phenyl]–OC₆H₁₃ | 6 |
| C₇H₁₅–[pyrimidine]–[phenyl]–[phenyl]–C₅H₁₁ | 6 |
| C₆H₁₃–[pyrimidine]–[phenyl]–[phenyl]–C₆H₁₇ | 8 |
| C₆H₁₃–[benzothiazole]–[phenyl]–OC₈H₁₇ | 2 |
| C₆H₁₃–[phenyl]–[thiazole]–[phenyl]–OCC₆H₁₃(=O) | 4 |
| C₆H₁₃–[phenyl]–[thiazole]–[phenyl]–OCC₈H₁₇(=O) | 5 |
| C₆H₁₃–[pyrimidine]–[phenyl]–OC(=O)–[thiophene]–C₄H₉ | 7 |
| C₁₂H₂₅–[pyrimidine]–[phenyl]–OC(=O)–[phenyl]–F | 5 |
| C₁₁H₂₃–[pyrimidine]–[phenyl]–OC(=O)–[phenyl](F)–F | 1 |

| Component | wt. % |
|---|---|
| 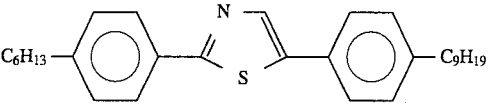 | 11 |
| 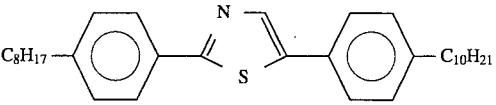 | 1 |
| 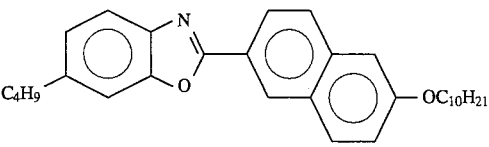 | 3 |
| 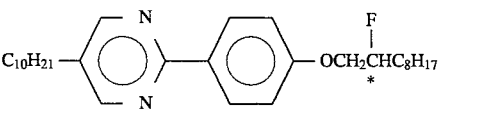 | 10 |
| [Composition T] | |
| 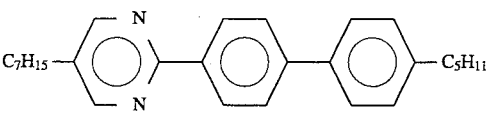 | 7 |
| 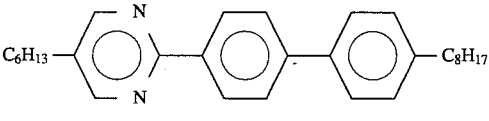 | 11 |
| 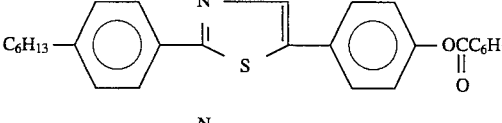 | 8 |
| 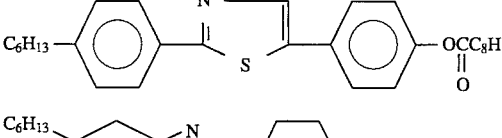 | 2 |
| 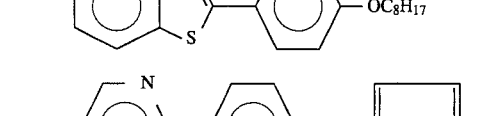 | 4 |
| 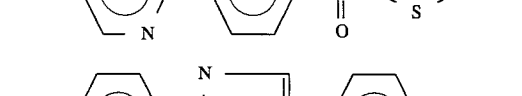 | 9 |
| 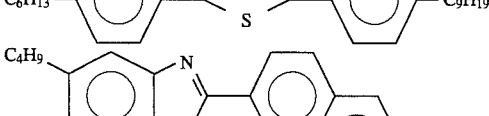 | 6 |
|  | 5 |
|  | 5 |

| Component | wt. % |
|---|---|
| 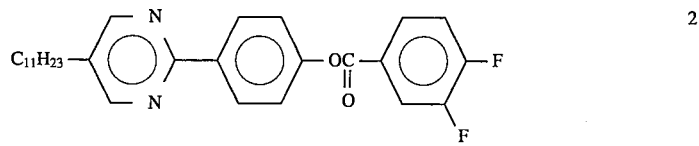 | 2 |
| 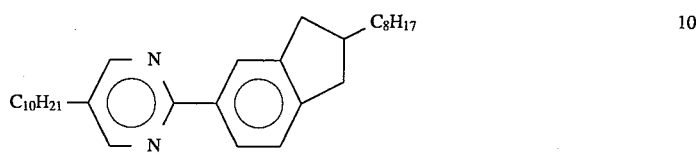 | 10 |
| 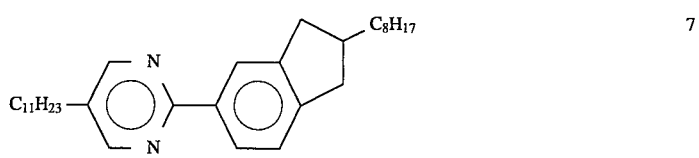 | 7 |
| 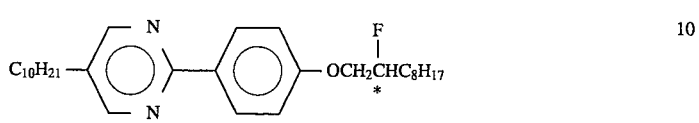 | 10 |
| 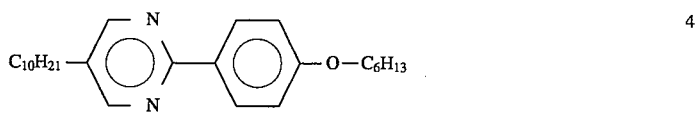 | 4 |
| 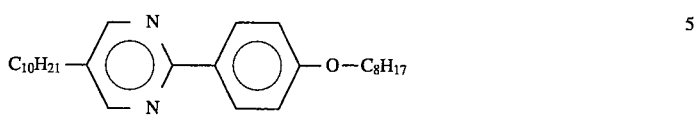 | 5 |
| 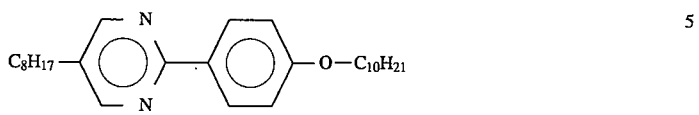 | 5 |
[Composition U]
| Component | wt. % |
|---|---|
| 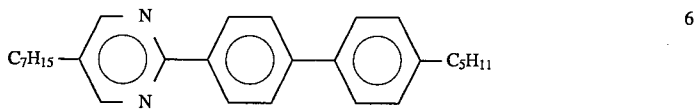 | 6 |
| 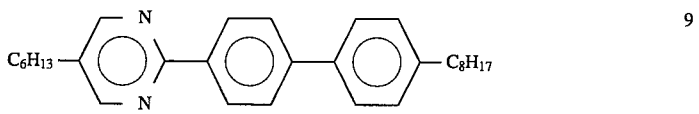 | 9 |
| 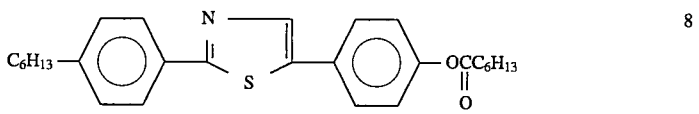 | 8 |
| 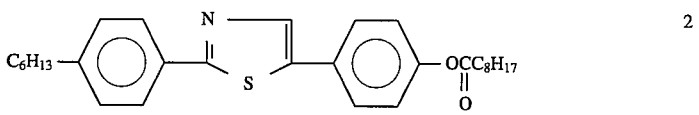 | 2 |
| 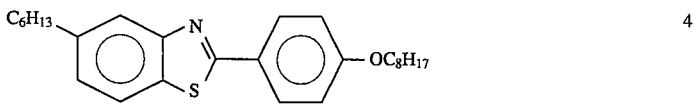 | 4 |

-continued
| Component | wt. % |
|---|---|
| 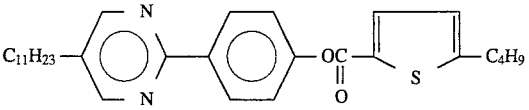 | 9 |
| 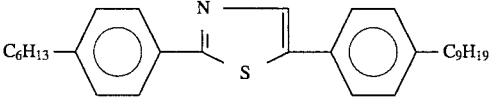 | 6 |
| 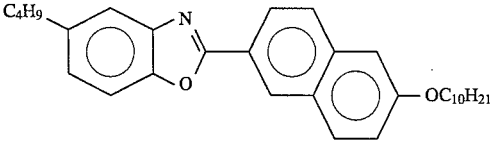 | 5 |
| 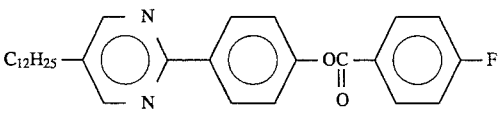 | 2 |
| 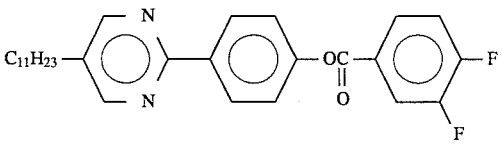 | 2 |
| 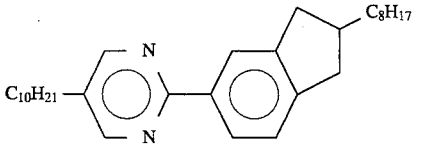 | 10 |
| 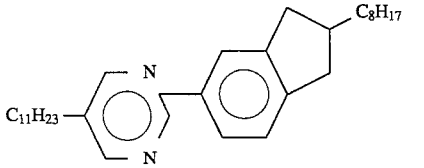 | 7 |
| 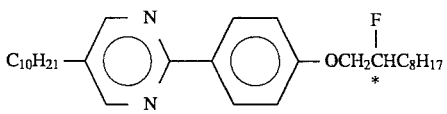 | 10 |
| 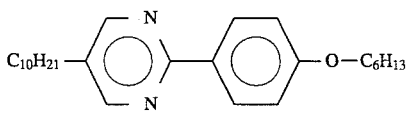 | 4 |
| 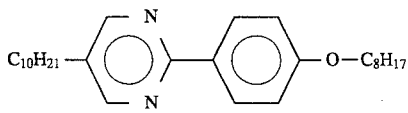 | 5 |
| 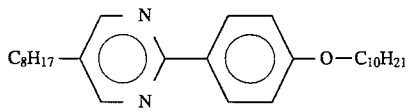 | 5 |

| Component | wt. % |
|---|---|
| 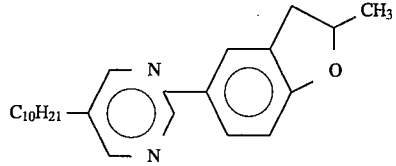 | 6 |
[Composition V]
| Component | wt. % |
|---|---|
| 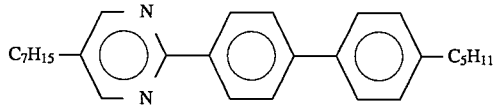 | 7 |
|  | 11 |
| 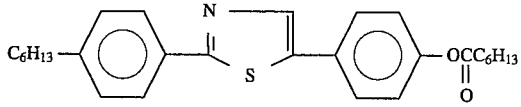 | 8 |
| 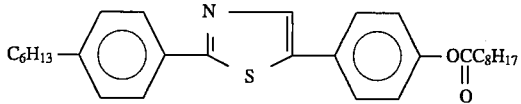 | 2 |
| 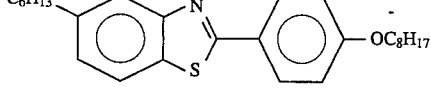 | 4 |
| 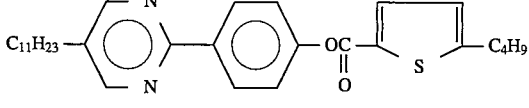 | 9 |
| 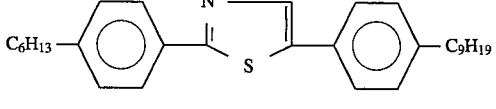 | 3 |
| 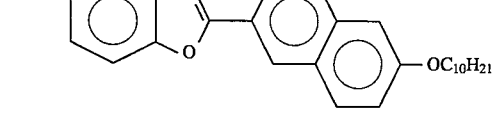 | 5 |
| 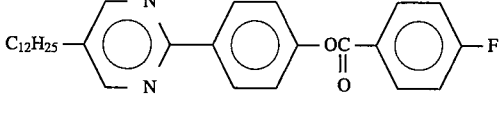 | 5 |
| 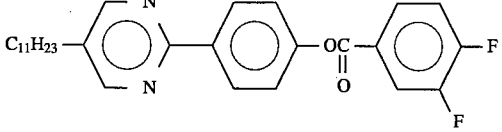 | 2 |

-continued

| Component | wt. % |
|---|---|
| 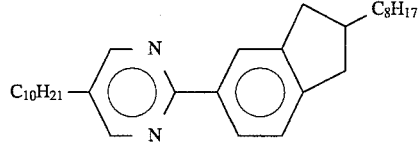 | 10 |
| 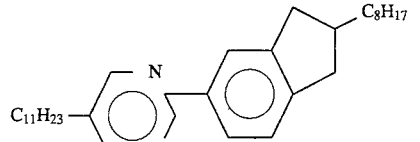 | 7 |
| 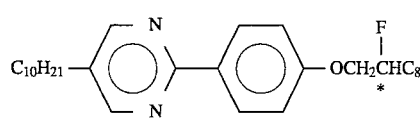 | 10 |
| 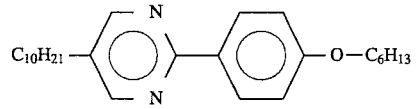 | 4 |
| 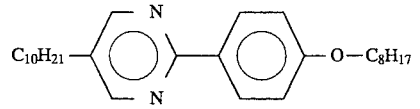 | 3 |
| 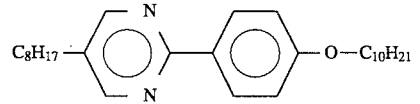 | 5 |
| 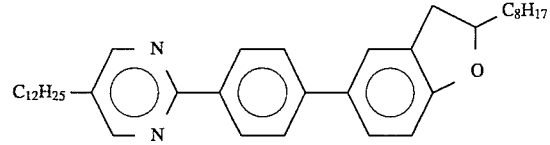 | 3 |
| 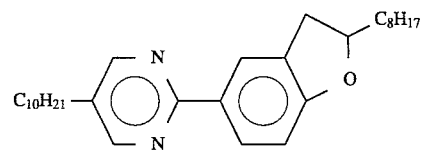 | 2 |

EXAMPLES 21–27

The temperature-dependence of response speed (response time) was evaluated with respect to commercially available liquid crystal compositions "CS-1017" (available from Chisso K.K.) and "ZLI-3233" (available from Merck Co.) showing Type VI layer spacing-changing characteristic and liquid crystal compositions L–R showing Type VII–IX layer spacing-changing characteristic.

Each liquid crystal device was prepared to have a structure similar to the one described with reference to FIG. 4 similarly as those used in Examples 1–20. More specifically, each device was prepared in the following manner.

Two 0.7 mm-thick glass sheets as substrates were coated with ITO films and further with insulating films. Each substrate was further coated with a polyimide resin precursor, followed by baking and rubbing with an acetate fiber yarn-planted cloth. Then, two substrates were applied to each other so as to form a cell gap of ca. 1.5 μm, which was then filled with a sample liquid crystal composition in isotropic phase or cholesteric phase, followed by gradual cooling to room temperature to provide a liquid crystal device.

Each liquid crystal device was subjected to measurement of response speed (response time) and the temperature dependence thereof was evaluated in terms of a temperature characteristic factor $f^{10/40}$ (a ratio of response time between 10° C. and 40° C.). A smaller value of $f^{10/40}$ represents a better temperature dependence of response speed.

The results are shown in Table 11 below.

TABLE 11

| Example | Composition | Type of d change | Response time (usec) 10° C. | 20° C. | 30° C. | 40° C. | $f^{10/40}$ |
|---|---|---|---|---|---|---|---|
| 21 | L | VII | 152 | 109 | 81 | 62 | 2.45 |
| 22 | M | VII | 134 | 102 | 81 | 59 | 2.27 |
| 23 | O | VIII | 141 | 100 | 80 | 61 | 2.31 |
| 24 | Q | IX | 236 | 154 | 109 | 75 | 3.15 |
| 25 | R | IX | 184 | 116 | 77 | 55 | 3.35 |
| 26 | CS1017 | VI | 825 | 325 | 180 | 100 | 8.25 |
| 27 | ZLI3233 | VI | 2560 | 1040 | 475 | 250 | 10.24 |

The results in Table 11 above show that the liquid crystal compositions showing Types VII–IX of layer spacing-changing characteristic (i.e., the layer spacing d assumes a first transition point in the vicinity of the SmA→SmC* phase transition temperature on temperature decrease and, on further temperature decrease, assumes a minimum (second transition point)) showed an improved temperature-dependence of response speed compared with the liquid crystal compositions showing Type VI of layer spacing changing characteristic (i.e., on temperature decrease, the layer spacing d in smectic phase monotonously decreases after having a first transition point or showing no flexural point in the neighborhood of the SmA→SmC* phase transition temperature).

EXAMPLES 28–33

The changes in alignment state and response speed characteristic due to low-temperature storage were examined.

Each sample device having a structure similar to the one described with reference to FIG. 4 was prepared in the following manner.

Two 1.1 mm-thick glass plates as substrates were respectively provided with transparent stripe electrodes of ITO (indium tin oxide) together with side metal electrodes of molybdenum and was further coated thereon with a 1500 Å-thick transparent dielectric film of tantalum oxide (not shown) by sputtering.

Onto the tantalum oxide film, an NMP solution of a polyimide precursor ("LQ-1802", mfd. by Hitachi Kasei K.K.) was applied by a printing method and baked at 270° C. to form a 300 Å-thick polyimide alignment control film. After the baking, the film was rubbed with an acetate fiber yarn-planted cloth.

Thus, the two substrates were treated in the above-described manner. Then, on one substrate, epoxy resin adhesive particles having an average particle size of 5.5 µm ("Toraypearl" mfd. by Toray K.K.) were dispersed at a density of 50 particles/mm² according to the Nordson electrostatic dispersion scheme. On the other substrate, silica microbeads having an average particle size of 1.5 µm were dispersed at a density of 300 particles/mm² by the Nordson electrostatic dispersion scheme. Then, onto one substrate, a liquid epoxy adhesive ("STRUCT BOND", mfd. by Mitsui Toatsu Kagaku K.K.) was applied by printing in a thickness of 6 µm. Then, the two substrates were applied to each other so that their rubbing directions were disposed in almost identical directions but with an anticlockwise intersection angle of 8 degrees and press-bonded to each other under a pressure of 2.8 kg/cm² for 5 min. at 70° C., followed by heating at 150° C. under a pressure of 0.63 kg/cm² for 4 hours to cure the two types of adhesives, thereby preparing a blank cell.

Then, the cell was evacuated to a reduced pressure of 10 Pa and filled with a sample liquid crystal composition heated to its isotropic phase to provide a liquid crystal device (panel).

Each liquid crystal device (panel) had a picture area defined by a lateral size of ca. 280 mm (data line side) and a vertical size of ca. 220 mm (scanning line side) providing 1280×1024 pixels.

For the low-temperature storage test, the respective sample liquid crystal panels were placed in a large-sized thermostatic vessel and cooled from room temperature at a rate of 1° C./min. to −25° C. while controlling the temperature so as to provide a substantially uniform temperature over the entire panel face, followed by standing for 5 hours at −25° C. and temperature-raising to room temperature at a rate of 3° C./min. Then, the alignment state and response speed of each sample panel were measured and compared with those before the low-temperature storage.

The results are shown in the following Table 12.

TABLE 12

| Example | Composition | Type of d change | Change after storage for 5 hours at −25° C. |
|---|---|---|---|
| 28 | O | VIII | no change |
| 29 | P | VIII | no change |
| 30 | Q | IX | no change |
| 31 | L | VII | θa*¹ and speed*² |
| 32 | M | VII | θa*¹ and speed*² |
| 33 | N | VII | θa*¹ and speed*² |

Note
*1) θa: The apparent tilt angle θa decreased after the low-temperature storage.
*2) Speed: The response speed changed after the low temperature storage.

As is understood from the results shown in Table 12.

the liquid crystal compositions L, M and N having Type VII of layer spacing-changing characteristic showed worse display performances, such as a decrease in θa resulting in a lower contrast and a change in response speed, after the low-temperature storage.

On the other hand, the liquid crystal compositions O, P and Q having Type VIII or IX of layer spacing-changing characteristic showed substantially no change after 5 hours of low-temperature storage. Accordingly, it is suggested that a liquid crystal composition having a third transition point shows a stable performance even after low temperature storage.

EXAMPLES 34–39

The changes in response speed and alignment state were examined by changing the conditions for the low-temperature storage. Liquid crystal compositions used were those having Type VII, VIII or IX of layer spacing-changing characteristic. Each sample panel was placed in a thermostatic vessel and cooled from room temperature at a rate of 1° C./min. to −10° C. or −25° C. while effecting a temperature control so as to provide a uniform temperature over the entire panel face, followed by standing at −10° C. or −25° C. for 120 hours and temperature raising to room temperature at a rate of 3° C./min or 3° C./hour. Then, the alignment state and response speed of each sample panel were measured and compared with those before the low-temperature storage.

The results are shown in the following Table 13 while representing the change after the low-temperature storage by a change in θa which was most noticeably caused.

TABLE 13

| Example | Composition | Type of d change | Storage for 120 hours | | | |
|---|---|---|---|---|---|---|
| | | | at −10° C. and raised | | at −25° C. and raised | |
| | | | at 3° C./m | at 3° C./h | at 3° C./m | at 3° C./h |
| 34 | Q | IX | no | no | no | no |
| 35 | R | IX | no | no | no | no |
| 36 | S | IX | no | no | no | no |
| 37 | L | VII | θa↓ | θa↓ | θa↓ | θa↓ |
| 38 | M | VII | θa↓ | θa↓ | θa↓ | θa↓ |
| 39 | N | VIII | no | no | θa↓ | θa↓ |
| 40 | O | VIII | θa↓ | θa↓ | no | θa↓ |

θa↓ represents that the apparent tilt angle θa decreased after the low-temperature storage.

As is shown in Table 13, the liquid crystal compositions Q, R and S having Type IX of layer spacing-changing characteristic showed no change in alignment state even after low-temperature storage under any conditions. Further, among the liquid crystal compositions N and O having Type VIII of layer spacing-changing characteristic, the composition N showed no change in alignment state or response speed after a storage at −10° C. where d did not exceed $d_A$.

The liquid crystal compositions having Type VIII of layer spacing-changing characteristic caused a decrease in θa after a storage at a temperature (−25 ° C.) causing d to exceed $d_A$ in some cases but the composition O was substantially free from a change in display characteristic after storage at −25° C. in case where the panel was warmed at a higher rate of 3 ° C./min. In this way, the effect of low-temperature storage could be different depending on a complex combination of factors, such as storage temperature, time and temperature-changing rate and could not be simply determined based on the storage temperature alone.

In addition to the experiments of which the results are described above, a large number of liquid crystal compositions were tested regarding the temperature-dependence of response speed and change in alignment state due to a low-temperature storage. As a result, it has been found that a liquid crystal composition having a $d_c/d_A$ ratio of at most 1.003 can withstand a low-temperature storage for a short period of ca. 5 hours. Further, a liquid crystal composition having a $d_{max}/d_A$ ratio of at most 1.003 can obviate occurrence of abnormalities due to low-temperature storage. On the other hand, a liquid crystal composition having a $d_{max}/d_A$ ratio smaller than 0.993 is liable to cause a slower response speed at low temperatures, thus making it difficult to effect a uniform image over a large-area panel over a wide temperature range.

Accordingly, in view of a possibility that a product in the form of a liquid crystal apparatus can be stored at a very low temperature during transportation by air or storage in a warehouse and the temperature and storage time can be unknown, it is prefer to use a liquid crystal composition having Type IX of layer spacing-changing characteristic, i.e., satisfying the relationship of the formula (11).

EXAMPLES 41–44

Experimental results are given showing that the inclusion of both an indan compound and a coumaran compound is effective in providing a liquid crystal compounds having better low-temperature storability.

The liquid crystal composition M contains none of indan compound or coumaran compound. On the other hand, the liquid crystal composition T contains 17% of an indan compound; the composition U contains 17% of an indan compound and 6% of a coumaran compound; and the composition V contains 17% of an indan compound and totally 5% of two coumaran compounds. As a result, the compositions M, T, U and V showed Types VII, VIII, IX and IX, respectively, of layer spacing-changing characteristic, thus suggesting that the inclusion of both indan and coumaran compounds provided compositions (U and V) which were expected to show excellent low-temperature storage durability (Type IX of layer spacing-changing characteristic).

A low-temperature storage test was performed by using these composition in the same manner as in Examples 34–39. The results are shown in the following Table 14.

TABLE 14

| Example | Composition | Type of d change | Storage for 120 hours | | | |
|---|---|---|---|---|---|---|
| | | | at −10° C. and raised | | at −25° C. and raised | |
| | | | at 3° C./m | at 3° C./h | at 3° C./m | at 3° C./h |
| 41 | T | VIII | no | no | θa↓ | θa↓ |
| | U | IX | no | no | no | no |
| | V | IX | no | no | no | no |
| | M | VII | θa↓ | θa↓ | θa↓ | θa↓ |

The expectation was confirmed by the experimental results. Thus, the composition U and V having Type IX of layer spacing-changing characteristic by inclusion of both indan and coumaran compounds caused no charge in display characteristics after the low temperature storage.

As has been described in detail, the liquid crystal composition according to the present invention has been provided with improved temperature-dependence of performances including a response speed and sufficient drive margin over an expected operational temperature range in a liquid crystal device, particularly a display device. Further, if the layer spacing d changing characteristic in SmA phase is adjusted, the composition is provided with a suppressed change in drive characteristic at high temperatures and provides a high contrast even after a storage at high temperatures. Further, if the layer spacing d-changing characteristic in SmC* phase is further adjusted, the composition is provided with further improved low-temperature performances and provides a very stable alignment state even after storage at low temperatures. Accordingly, by using the liquid crystal composition and the liquid crystal device including the composition according to the present invention, it is possible to provide a liquid crystal apparatus, particularly a liquid crystal display apparatus, capable of exhibiting excellent display performances.

What is claimed is:

1. A liquid crystal composition, successively assuming cholesteric phase, SmA phase and SmC* phase on temperature decrease, said liquid crystal composition having a temperature-dependence of layer spacing d in smectic phase such that the layer spacing d (i) increases, is constant or decreases on temperature decrease in SmA phase temperature range, (ii) assumes a first transition point where the layer spacing d commences to decrease or commences a discontinuously larger rate of decrease on temperature decrease at or around a transition temperature from SmA phase to SmC* phase and (iii) assumes a second transition point in SmC* temperature range where the layer spacing d commences to increase on further temperature decrease below the first transition point.

2. A liquid crystal composition according to claim 1, assuming SmA phase over a temperature range of at least 20° C.

3. A liquid crystal composition according to claim 1, wherein the layer spacing d assumes a layer spacing $d_A$ at the first transition point and a layer spacing $d_{min}$ at the second transition point satisfying a relationship of $0.966 \leq d_{min}/d_A$.

4. A liquid crystal composition according to claim 1, wherein the second transition point in SmC* phase is in the range of 20°–50° C.

5. A liquid crystal composition according to claim 1, having a cone angle (H) which increases, assumes a maximum and then decreases on successive temperature decrease in SmC* phase.

6. A liquid crystal composition according to claim 1, containing at least one species of mesomorphic compound represented by the following formula (A):

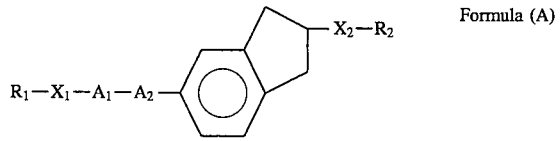

Formula (A)

wherein $R_1$ and $R_2$ independently denote a linear or branched alkyl group having 1–18 carbon atoms; $X_1$ and $X_2$ independently denote a single bond, —O—, —CO.O—, or —O.CO—; $A_1$ denotes a single bond,

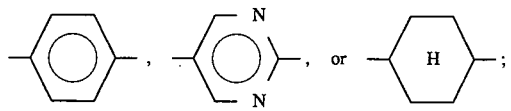

$A_2$ denotes

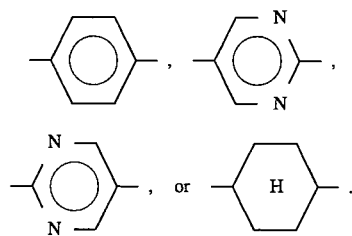

7. A liquid crystal composition according to claim 1, wherein the layer spacing d increases on temperature decrease or is constant in SmA phase temperature range.

8. A liquid crystal composition according to claim 7, wherein the layer spacing d assumes $d_A$ at said first transition point and $d_{min}$ at said second transition point, satisfying a formula: $0.975 < d_{min}/d_A < 0.990$, with the proviso that in case where the layer spacing d does not have a clear flexural point or a discontinuous change in the vicinity of the SmA-to-SmC* phase transition temperature, d at the SmA-to-SmC* transition temperature is taken as $d_A$.

9. A liquid crystal composition according to claim 7, containing at least one species of mesomorphic compound represented by formula (A) below and at least one species of mesomorphic compound represented by formula (B) below:

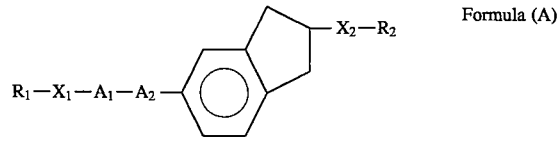

Formula (A)

wherein $R_1$ and $R_2$ independently denote a linear or branched alkyl group having 1–18 carbon atoms; $X_1$ and $X_2$ independently denote a single bond, —O—, —CO.O—, or —O.CO—; $A_1$ denotes a single bond,

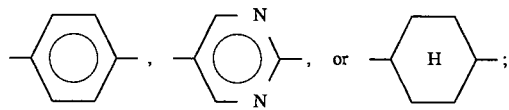

$A_2$ denotes

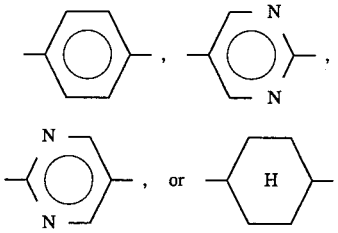

and

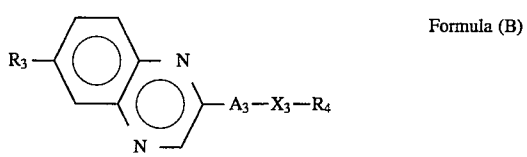

Formula (B)

wherein $R_3$ and $R_4$ independently, denote a linear or branched alkyl group having 1–18 carbon atoms; $X_3$ denotes a single bond, —O—, —CO.O— or —O.CO—; and $A_3$ denotes

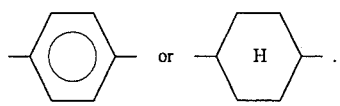

10. A liquid crystal composition according to claim 9, wherein said mesomorphic compound represented by the formula (A) and said mesomorphic compound represented by the formula (B) are respectively contained in an amount of 1–30 wt. %.

11. A liquid crystal composition according to claim 1, wherein the layer spacing d assumes a third transition point where the layer spacing d turns to decrease on further temperature below the second transition point in SmC* phase.

12. A liquid crystal composition according to claim 11, wherein said second transition point is in the temperature range of 20°–50° C.

13. A liquid crystal composition according to claim 11, wherein said second transition point is in the temperature range of 30°–50° C.

14. A liquid crystal composition according to claim 11, wherein the layer spacing d assumes a value $d_A$ at the first transition point and a value $d_{min}$ at the second transition point satisfying a relationship of $0.966 \leq d_{min}/d_A$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

15. A liquid crystal composition according to claim 11, wherein the layer spacing d assumes a value $d_A$ at the first transition point and a value $d_{min}$ at the second transition point satisfying a relationship of $0.978 \leq d_{min}/d_A$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

16. A liquid crystal composition according to claim 11, wherein the layer spacing d assumes a minimum $d_c$ in a range below said transition point and within SmC* phase down to a lower temperature phase, satisfying a relationship with a layer spacing $d_A$ at the first transition point as follows: $d_c/d_A \leq 1.003$ . . . (10).

17. A liquid crystal composition according to claim 16, wherein the layer spacing d assumes a value $d_A$ at the first transition point and a value $d_{min}$ at the second transition point satisfying a relationship of $0.966 \leq d_{min}/d_A$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

18. A liquid crystal composition according to claim 16, wherein the layer spacing d assumes a value $d_A$ at the first transition point and a value $d_{min}$ at the second transition point satisfying a relationship of $0.978 \leq d_{min}/d_A$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

19. A liquid crystal composition according to claim 11, wherein the layer spacing d assumes a value $d_A$ at the first transition point and a value $d_{max}$ at the third transition point satisfying a relationship of $0.993 \leq d_{max}/d_A \leq 1.003$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

20. A liquid crystal composition according to claim 19, wherein the layer spacing d assumes a value $d_A$ at the first transition point and a value $d_{min}$ at the second transition point satisfying a relationship of $0.966 \leq d_{min}/d_A$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

21. A liquid crystal composition according to claim 19, wherein the layer spacing d assumes a value $d_A$ at the first transition point and a value $d_{min}$ at the second transition point satisfying a relationship of $0.978 \leq d_{min}/d_A$, with the proviso that, in case where the layer spacing changes without showing a clear flexural point or a discontinuous change in the vicinity of the SmA-to-SmC* transition temperature, a value of layer spacing d at the SmA-to-SmC* transition temperature is taken as $d_A$.

22. A liquid crystal composition according to claim 11, containing at least one species of mesomorphic compound represented by formula (A) below and at least one species of mesomorphic compound represented by formula (C) below:

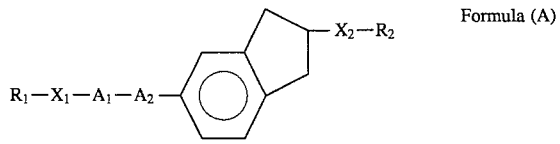

Formula (A)

wherein $R_1$ and $R_2$ independently denote a linear or branched alkyl group having 1–18 carbon atoms; $X_1$ and $X_2$ independently denote a single bond, —O—, —CO.O—, or —O.CO—; $A_1$ denotes a single bond,

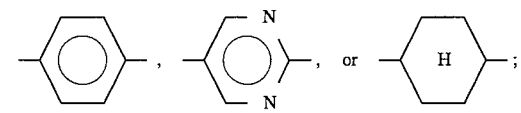

$A_2$ denotes

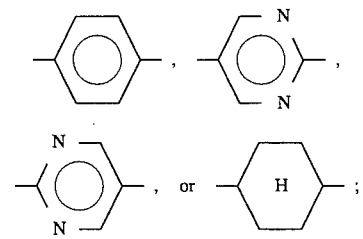

and

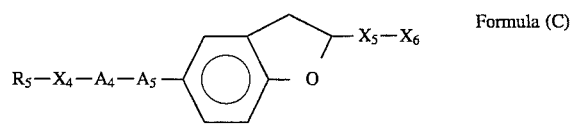

Formula (C)

wherein $R_5$ and $R_6$ independently denote a linear or branched alkyl group having 1–18 carbon atoms; $X_4$ and $X_5$ independently denote a single bond, —O—, —CO.O— or —O.CO—; $A_4$ denotes a single bond

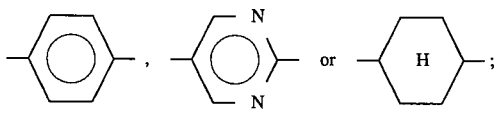

$A_5$ denotes

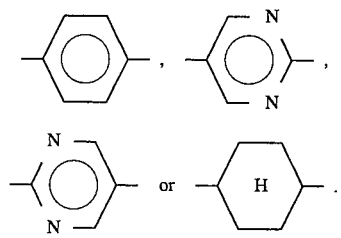

23. A liquid crystal composition according to claim 22, wherein said mesomorphic compound represented by the formula (A) and said mesomorphic compound represented by the formula (C) are respectively contained in an amount of 1–30 wt. %.

24. A liquid crystal device, comprising: a pair of substrates, and a liquid crystal composition according to any one of claims 1–23 disposed between the substrates.

25. A liquid crystal device according to claim 24, wherein at least one of the substrates has thereon an alignment control layer.

26. A liquid crystal device according to claim 25, wherein said alignment control layer has been subjected to a uniaxial aligning treatment.

27. A liquid crystal device according to claim 24, wherein said pair of substrates are disposed with a gap therebetween which is small enough to release a helical structure of liquid crystal molecules of said liquid crystal composition disposed therebetween.

28. A liquid crystal device according to claim 24, wherein said pair of substrates are provided with alignment control layers having uniaxial alignment axes which intersect each other at a prescribed angle; and said liquid crystal composition is placed in an alignment state providing a pretilt angle $\alpha$, cone angle H, and a smectic layer inclination angle $\delta$ in SmC* phase satisfying following formulae (2) and (3); and the liquid crystal composition in the alignment state assumes at least two stable states providing optical axes forming an angle $2\theta a$ therebetween ($\theta a$: apparent tilt angle) satisfying the following formula (4) with respect the cone angle H:

$$(H) < \alpha + \delta \quad (2)$$

$$\delta < \alpha \quad (3)$$

$$(H) > \theta a > H/2 \quad (4).$$

29. A liquid crystal apparatus, comprising a liquid crystal device according to claim 24, and means for driving the liquid crystal device.

* * * * *

UNITED STATES PATENT AND TRADEMARK OFFICE
CERTIFICATE OF CORRECTION

PATENT NO. : 5,582,763

DATED : December 10, 1996

INVENTOR(S) : SYUJI YAMADA ET AL.

Page 1 of 5

It is certified that error appears in the above-identified patent and that said Letters Patent is hereby corrected as shown below:

On title page,

AT [30] FOREIGN APPLICATION PRIORITY DATA

"5-026521                --5-265621
 5-026522" should read    5-265622--.

AT [56] REFERENCES CITED

Foreign Patent Documents,
"01140198   6/1989   Japan
 03252624   11/1991  Japan" should read
--01-140198  6/1989   Japan
  03-252624  11/1991  Japan--.

COLUMN 3

Line 6, "provide" should read --providing a--.

COLUMN 4

Line 20, "part of the all or" should read --part or all of--.

COLUMN 5

Line 44, "a" should read --$\alpha$--.
Line 53, "ia" should read --a--.

COLUMN 7

Line 52, "increase," should read --increases,--.

UNITED STATES PATENT AND TRADEMARK OFFICE
CERTIFICATE OF CORRECTION

PATENT NO. : 5,582,763
DATED : December 10, 1996
INVENTOR(S) : SYUJI YAMADA ET AL.

Page 2 of 5

It is certified that error appears in the above-identified patent and that said Letters Patent is hereby corrected as shown below:

COLUMN 9

Line 64, "leas" should read --least--.

COLUMN 11

Line 12, "tet- — — -phe- — -dec" should read --tet- — — -phe- — -ocd--.

COLUMN 13

Line 42, "hex- — — -pry- — -oct" should read --hex- — — -pry1- — -oct--.

COLUMN 15

Line 26, "Z or" should read --Z--.

COLUMN 18

Line 36, "an sealing" should read --a sealing--.

COLUMN 20

Line 18, "θ," should read --$\delta$,--.
Line 41, "right angle cross" should read --right-angle cross- --.
Line 42, "polarizes" should read --polarizers--.
Line 31, "right angle-cross nicol" should read --right-angle cross-nicol--.

UNITED STATES PATENT AND TRADEMARK OFFICE
CERTIFICATE OF CORRECTION

PATENT NO. : 5,582,763

DATED : December 10, 1996

INVENTOR(S) : SYUJI YAMADA ET AL.

Page 3 of 5

It is certified that error appears in the above-identified patent and that said Letters Patent is hereby corrected as shown below:

COLUMN 24

Line 7, "A   -8.6   65.5   88.9   95.6   I,II   23.4"
should read
--A   -8.6   65.5   88.9   95.6   I,III   23.4--.

COLUMN 34

Table 7, "14   F   0.986   15.0   10.2   11.8   0,25   0.33   0.35"
should read
--14   F   0.986   15.0   10.2   11.8   0.25   0.33   0.35--.

COLUMN 35

Table 8-1, "19   J   III   14.7   10.4   11.6   193   58   3.33
           20   K   III   14.5   10.2   11.5   178   53   3.36"
should read
--19   J   I,III   14.7   10.4   11.6   193   58   3.33
  20   K   I,III   14.5   10.2   11.5   178   53   3.36--.

Line 55, "characterize" should read --characterized--.

COLUMN 52

Line 36, "12." should read --12,--.

UNITED STATES PATENT AND TRADEMARK OFFICE
CERTIFICATE OF CORRECTION

PATENT NO. : 5,582,763
DATED : December 10, 1996
INVENTOR(S) : SYUJI YAMADA ET AL.

It is certified that error appears in the above-identified patent and that said Letters Patent is hereby corrected as shown below:

COLUMN 54

Line 25, "a" should be deleted.
Table 14, "U   IX   no   no   no   no
         V   IX   no   no   no   no
         M   VII  θa↓  θa↓  θa↓  θa↓"
should read
--42   U   IX   no   no   no   no
  43   V   IX   no   no   no   no
  44   M   VII  θa↓  θa↓  θa↓  θa↓--.
Line 59, "composition" should read --compositions--.

COLUMN 56

Line 64, "independently," should read --independently--.

COLUMN 58

Line 67, "bond" should read --bond,--.

UNITED STATES PATENT AND TRADEMARK OFFICE
CERTIFICATE OF CORRECTION

PATENT NO. : 5,582,763
DATED : December 10, 1996
INVENTOR(S) : SYUJI YAMADA ET AL.

Page 5 of 5

It is certified that error appears in the above-identified patent and that said Letters Patent is hereby corrected as shown below:

COLUMN 60

Line 13, "angle H," should read --angle $\text{\textcircled{H}}$,--.
Line 18, "the cone angle H:" should read --to the cone angle $\text{\textcircled{H}}$:--.

Signed and Sealed this

Seventeenth Day of June, 1997

Attest:

BRUCE LEHMAN

Attesting Officer

Commissioner of Patents and Trademarks